US012754196B2

(12) United States Patent
McReynolds et al.

(10) Patent No.: US 12,754,196 B2
(45) Date of Patent: Oct. 6, 2026

(54) INTEGRATED SYSTEM FOR PROCESSING SAMPLES

(71) Applicant: Oakland Chemical, Inc., Rochester, MI (US)

(72) Inventors: Steven McReynolds, Rochester, MI (US); Angelo Lopez, Rochester, MI (US)

(73) Assignee: OAKLAND CHEMICAL, INC., Rochester, MI (US)

(*) Notice: Subject to any disclaimer, the term of this patent is extended or adjusted under 35 U.S.C. 154(b) by 452 days.

(21) Appl. No.: 18/500,269

(22) Filed: Nov. 2, 2023

(65) Prior Publication Data

US 2025/0060384 A1 Feb. 20, 2025

Related U.S. Application Data

(60) Provisional application No. 63/533,042, filed on Aug. 16, 2023.

(51) Int. Cl.

| | |
|---|---|
| ***G01N 1/00*** | (2006.01) |
| ***G01N 35/00*** | (2006.01) |
| ***G01N 35/04*** | (2006.01) |
| ***G01N 35/10*** | (2006.01) |

(52) U.S. Cl.

CPC ....... *G01N 35/04* (2013.01); *G01N 35/00732* (2013.01); *G01N 35/0092* (2013.01); *G01N 35/0098* (2013.01); *G01N 35/1011* (2013.01); *G01N 35/1016* (2013.01); *G01N 35/1081* (2013.01); *G01N 2035/00435* (2013.01); *G01N 2035/00752* (2013.01); *G01N 2035/00851* (2013.01); *G01N 2035/0413* (2013.01); *G01N 2035/0415* (2013.01); *G01N 2035/0436* (2013.01); *G01N 2035/0465* (2013.01); *G01N 2035/0475* (2013.01)

(58) Field of Classification Search

None

See application file for complete search history.

(56) References Cited

U.S. PATENT DOCUMENTS

| | | | |
|---|---|---|---|
| 9,810,211 | B2 | 11/2017 | Davidian et al. |
| 10,698,426 | B2 | 6/2020 | Ding et al. |
| 11,513,477 | B2 | 11/2022 | Strohmenger et al. |
| 11,586,188 | B2 | 2/2023 | Cella et al. |

(Continued)

*Primary Examiner* — Jyoti Mutreja

(74) *Attorney, Agent, or Firm* — Foley & Lardner LLP

(57) ABSTRACT

A system for processing samples includes sample supplies to supply samples, a channel connected to the sample supplies, a device connected to the channel to collect first information about the samples, and a controller. The controller is to perform a cycling operation: controlling a first sample supply of the sample supplies to supply a first sample in the first sample supply to the channel, controlling the device to collect the first information about the first sample in the channel, storing data associated with the first sample, including the first information about the first sample, evaluating the data against preprogramed thresholds and implementing the addition of water, chemical, product or recycled product, and controlling the first sample supply to discharge the first sample in the channel into the first sample supply. The controller is to repeat the cycling operation for a second sample.

17 Claims, 13 Drawing Sheets

(56) References Cited

U.S. PATENT DOCUMENTS

| | | | | |
|---|---|---|---|---|
| 2014/0026684 | A1* | 1/2014 | Weber | G01N 35/1095 73/863.41 |
| 2022/0349897 | A1 | 11/2022 | Tran et al. | |
| 2023/0013614 | A1 | 1/2023 | Wilder et al. | |
| 2023/0073021 | A1 | 3/2023 | Atchison | |
| 2023/0256440 | A1* | 8/2023 | Pugliese | G01N 1/34 422/527 |

* cited by examiner

410

| System Level (412) | Immediate Text (414) | Immediate Email (414) | Daily Summary (414) | Description (416) |
|---|---|---|---|---|
| pH Low Level Alarm | | | x | pH is low |
| pH High Level Alarm | | | x | pH is high |
| Concentration Low Alarm | x | x | x | Concentration is low |
| Concentration High Alarm | | | x | Concentration is high |
| Temperature Low Alarm | | | x | Temperature is low |
| Temperature High Alarm | | | x | Temperature is high |
| Makeup Use Over Max | | | x | We used more RO WATER product than daily allowance |
| Product Use Over Max | | | x | We used more COOLANT product than daily allowance |
| High Dropline Usage | x | x | x | We used more DROPLINE than daily allowance |
| Low Flow Alarm | | x | x | Pump or something is wrong with the system in pumping to the control board |
| Data Age | | x | x | No Data sent to the cloud in the last 4 hours |
| **Unit Level** | | | | |
| Calibration | | | x | Need to calibrate at least one of the sensors |
| Emergancy High Usage | x | x | x | Water Make-up is higher than allowable for all systems - RO Water valve is not closed |
| Low Chemical Level | | x | x | Drum Level is low |

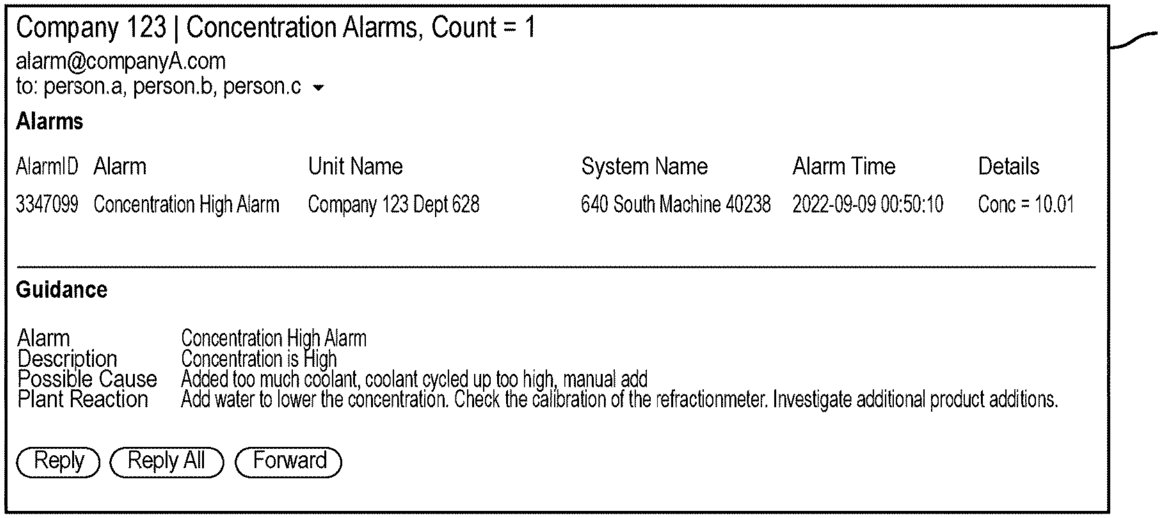

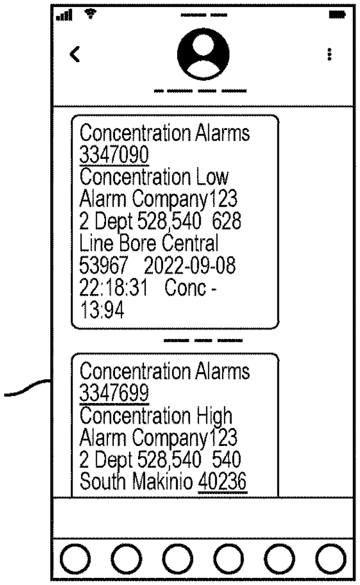

FIG. 4

INTEGRATED SYSTEM FOR PROCESSING SAMPLES

CROSS-REFERENCE TO RELATED APPLICATIONS

This application claims the benefit of and priority to U.S. Provisional Patent Application No. 63/533,042, filed Aug. 16, 2023, the entire contents of which are incorporated herein by reference.

BACKGROUND

The following description is provided to assist the understanding of the reader. None of the information provided or references cited is admitted to be prior art.

Historically, in chemical processes, samples were obtained manually and taken to a laboratory for testing. The testing is manual where an operator needs to prepare the sample, test the sample, and record data by writing it down or entering it into a computer spreadsheet or other program. During the laboratory testing, automated samplers may be used such as an autosampler cassette for an autotitrator, although the sample is still manually obtained. When testing results require an adjustment to the sample/testing, the adjustment is manually done. Alternately, historically, a control system may be implemented, dedicated specifically for a single local sample supply, but there is no single control system for a plurality of samples The present disclosure generally relates to an integrated system and a method for operating the same to process samples. Specifically, a single integrated system can automatically and sequentially perform cycle operation for multiple samples. The cycle operation, for example, may include one or more steps of collecting a sample from multiple sample supplies, operating a device to process the sample, collecting data from the sample, and performing analysis, and the integrated system can perform the cycle operation for at least some of the multiple samples. For example, the integrated system can sequentially introduce the multiple samples to process and can selectively activate (e.g., turning on and off) a device to collect/analyze/store data associated with the sample during each process and/or cycle. This use of an integrated system for multiple samples allows for consistent, reliable, and cost-efficient sample processing and chemical control.

SUMMARY

An aspect of the present disclosure provides systems for processing samples including a plurality of sample supplies configured to supply a plurality of samples; a sample channel connected to the plurality of sample supplies; a first device connected to the sample channel, the first device configured to collect first information about the plurality of samples; and a controller configured to perform a cycling operation. The cycling operation includes (i) controlling a first sample supply of the plurality of sample supplies to supply a first sample in the first sample supply to the sample channel; (ii) controlling the first device to collect the first information about the first sample in the sample channel; (iii) storing data associated with the first sample, the data including the first information about the first sample; and (iv) controlling the first sample supply to discharge the first sample in the sample channel into the first sample supply.

The controller is configured to repeat the cycling operation for a second sample supply and a second sample supplied by the second sample supply.

In some examples, the controller is configured to repeat the cycling operation for a predetermined number of sample supplies and a predetermined number of samples supplied by the predetermined number of sample supplies.

In some examples, the controller is configured to repeat the cycling operation for a predetermined number of times for the first sample supply and the first sample supplied by the first sample supply, prior to repeating the cycling operation for the second sample supply and the second sample supplied by the second sample supply.

In some examples, the controller is configured to repeat the cycling operation for the plurality of sample supplies and the plurality of samples supplied by the plurality of sample supplies, until a shutdown condition is triggered.

In some examples, the cycling operation includes waiting for a predetermined delay time prior to controlling the first device to collect the first information about the first sample in the sample channel.

In some examples, the cycling operation includes waiting for a predetermined delay time prior to repeating the cycling operation for the second sample supply and the second sample supplied by the second sample supply.

In some examples, the systems include a reservoir configured to supply chemical to the sample channel, wherein the controller is configured to control the reservoir to supply the chemical to the sample channel.

In some examples, prior to repeating the cycling operation for the second sample supply and the second sample supplied by the second sample supply, the controller is configured to, based at least in part on the data associated with the first sample, at least one of: repeat the cycling operation for the first sample supply and the first sample supplied by the first sample supply; or control the reservoir to supply the chemical to the sample channel.

In some examples, the cycling operation includes, prior to controlling the first sample supply to discharge the first sample in the sample channel into the first sample supply, analyzing the data associated with the first sample, and based on the analysis, controlling the reservoir to supply the chemical to the sample channel.

In some examples, the controller is configured to send at least a portion of the data associated with the first sample to a user or a database via a network.

In some examples, the data includes timeseries data associated with the first sample.

In some examples, the controller is configured to generate an alarm responsive to the data indicating that a value associated with the first sample is higher or lower than a threshold value.

In some examples, the systems include a second device connected to the sample channel, the second device configured to collect second information about the plurality of samples. The cycling operation includes selectively activating at least one of the first device and the second device based at least in part on a parameter associated with the first sample.

Another aspect of the present disclosure provides a controller for processing samples, the controller configured to perform a cycling operation. The cycling operation includes (i) controlling a first sample supply of a plurality of sample supplies to supply a first sample in the first sample supply to a sample channel; (ii) controlling a first device to collect first information about the first sample in the sample channel; (iii) storing data associated with the first sample, the data including the first information about the first sample; and (iv) controlling the first sample supply to discharge the first sample in the sample channel into the first sample supply. The controller is configured to repeat the cycling operation for a second sample supply and a second sample supplied by the second sample supply.

In some examples, the controller is configured to repeat the cycling operation for a predetermined number of sample supplies and a predetermined number of samples supplied by the predetermined number of sample supplies.

In some examples, the controller is configured to repeat the cycling operation for a predetermined number of times for the first sample supply and the first sample supplied by the first sample supply, prior to repeating the cycling operation for the second sample supply and the second sample supplied by the second sample supply.

In some examples, the controller is configured to repeat the cycling operation for the plurality of sample supplies and the plurality of samples supplied by the plurality of sample supplies, until a shutdown condition is triggered. In some examples, the shutdown condition is triggered manually or automatically.

In some examples, the controller is configured to send the data associated with the first sample to a user or a database via a network.

In some examples, the cycling operation includes, prior to controlling the first sample supply to discharge the first sample in the sample channel into the first sample supply, analyzing the data associated with the first sample, and based on the analysis, controlling the reservoir to supply the chemical to the sample channel.

Another aspect of the present disclosure provides methods for processing samples. The methods include performing a cycling operation. The cycling operation includes controlling a first sample supply of a plurality of sample supplies to supply a first sample in the first sample supply to a sample channel; controlling a first device to collect first information about the first sample in the sample channel; analyzing the first information; supplying chemical to the sample channel in response to the analysis; controlling the first sample supply to discharge the first sample in the sample channel into the first sample supply; and repeating the cycling operation for a second sample supply and a second sample supplied by the second sample supply. In some examples, the chemical is one of a chemical product, recycled sample or water. In some examples, the method includes, in response to the analysis, controlling the sample supply to discharge the sample in the sample channel into the sample supply or to introduce more of the sample in the sample supply into the sample channel.

In some examples, the methods include repeating the cycling operation for a predetermined number of sample supplies and a predetermined number of samples supplied by the predetermined number of sample supplies.

In some examples, the methods include supplying chemical to the sample channel.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 4 depicts an example application of the controller shown in FIG. 1, according to some examples.

DETAILED DESCRIPTION

Figure 1:
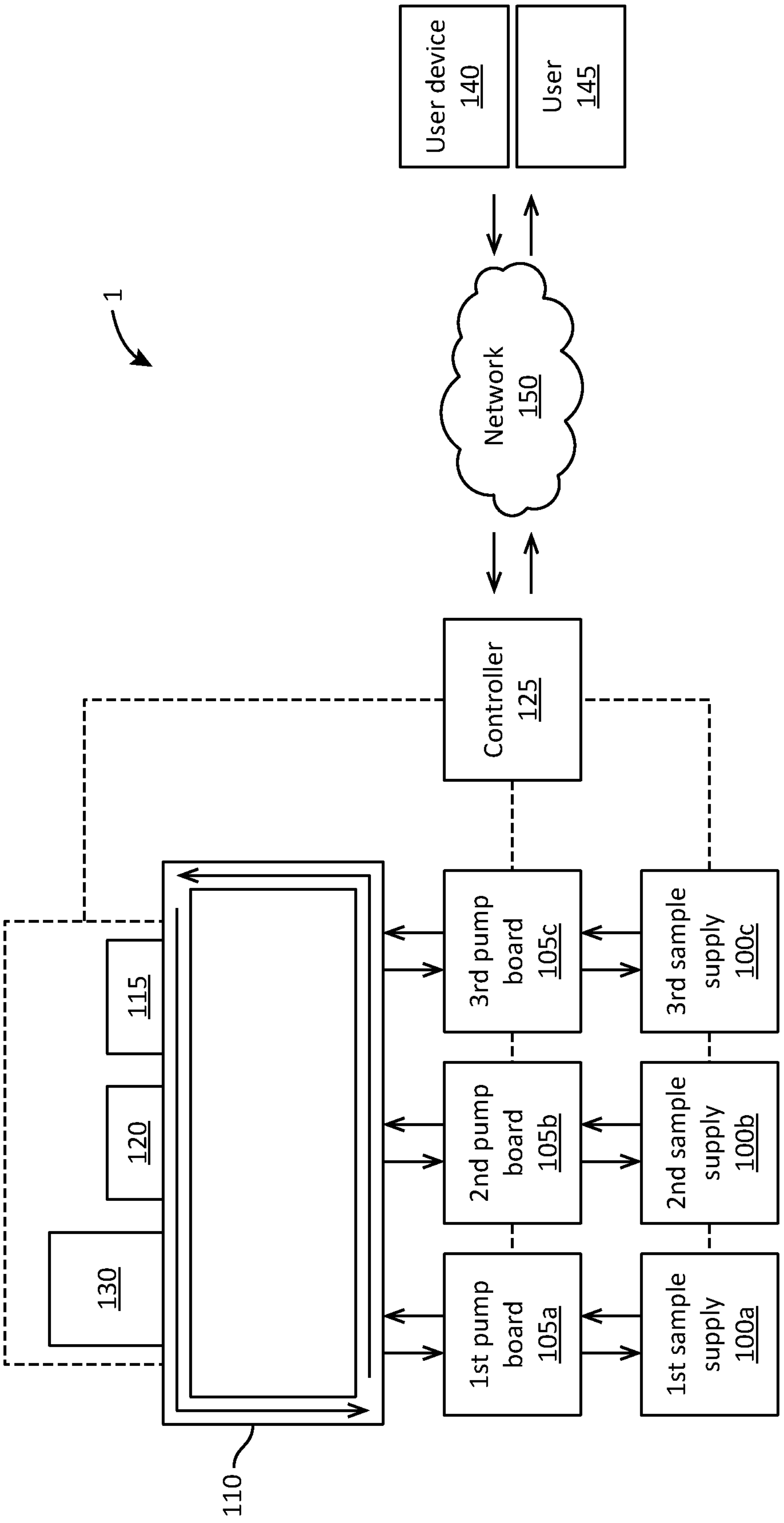
FIG. 1 depicts a block diagram of a system for processing samples, according to some examples.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Described herein is an integrated system configured to perform cycle operation to process multiple samples.

As used herein, the "sample" and variations thereof may refer to liquid, powder, gas, or the like that is subject to a process in various environments. Non-limiting examples of the "sample" may be any liquid, powder, gas, or the like in the fields of metal manufacturing, cleaning, material coating, electronics manufacturing, semiconductor fabrication, food/beverage application (e.g., clean in place tanks, food production, etc.), oil/gas applications, municipal applications, etc. Non-limiting examples of the "sample" may be or include metalworking fluid, washer fluid, polymer quench, metal finishing fluid, water treatment chemical, rust inhibitor, fluid for swimming pools, disinfection fluid, etc.

The term "process" and variations thereof, as used herein, may refer to one or more actions or steps to change (e.g., alter, adjust, manipulate, etc.) a property (e.g., physical, chemical, etc.) of a sample or one or more actions or steps to determine (e.g., measure, detect, sense, test, or otherwise collect information about) such a property (e.g., physical, chemical, etc.) of a sample. In some examples, the term "process" and variations thereof may include one or more actions or steps to collect, analyze, and/or communicate data associated with a sample. A non-limiting example of "process" may be adjusting a chemical level (e.g., increasing/decreasing a concentration to a target) of a sample by adding chemical or water.

Described herein is an integrated system for performing cycle operation to process multiple samples sequentially and automatically. The cycle operation may include controlling various devices (e.g., sample supplies, processing devices, etc.) in the integrated system such that each of the multiple samples can be sequentially and automatically processed during the cycle operation. The integrated system described herein can control a component associated with each of multiple samples so as to control the multiple samples individually while performing the cycle operation. For example, the cycle operation may include introducing samples sequentially from multiple sample supplies into a sample channel and selectively operating at least one of a plurality of devices to process the sample in the sample channel. This system provides an improved, consistent, and reliable process for processing multiple samples in an integrated fashion, while allowing for a flexible process for individual samples.

FIG. 1 depicts a block diagram of a system 1 for processing samples, according to some examples. The system 1 includes sample supplies 100, pump boards 105, a sample channel 110, a first device 115, a second device 120, a chemical reservoir 130, a controller 125, a network 150, a user device 140, and a user 145.

The sample supplies 100 may be or include any container configured to contain a sample. The sample supplies 100 may include a plurality of sample supplies (e.g., 100*a*, 100*b*, 100*c*). The sample supplies 100 may include any number of sample supplies, and shown in FIG. 1 is a non-limiting example. In some examples, the sample supplies 100 may include or be connected to the pump boards 105, and can supply the samples through the pump boards 105 to the sample channel 110.

The capacity of the sample supplies 100 may be, but not limited to, 5 gallons (around 18.9 liters) to 1 million gallons (around 3.78 million liters). For example, the capacity of the sample supplies 100 may be 70 gallons (around 265 liters), 1,000 gallons (around 3780 liters), or 10,000 gallons (around 37800 liters). Non-limiting examples of the sample supplies 100 may be or include, but not limited to, a metalworking fluid tank, a washer fluid tank, a polymer quench tank, a metal finishing bath, a water treatment bath, a rust inhibitor tank, a swimming pool, a water treatment tank, a disinfection fluid tank, etc.

As shown in FIG. 1, each of the sample supplies 100 (e.g., 100*a*, 100*b*, 100*c*) may include or be connected to a respective one of the pump boards 105 (e.g., 105*a*, 105*b*, 105*c*). In some examples, each of the pump boards 105 can be controlled to perform operations associated with the respective sample supplies 100. The pump boards 105 may include a plurality of components including a valve, a pump, a flowmeter, etc. to control supply of the samples to the sample channel 110. For example, the pump boards 105 can pump the samples and covey the samples to the sample channel 110. For example, the pump boards 105 can control a rate, a pressure, and/or a flux of the sample being supplied to the sample channel 110. In some examples, the pump boards 105 may include a filter. In some examples, each of the sample supplies 100 may include or be connected to any number of the pump boards 105. In some examples, each of the sample supplies 100 may include or be connected to a different type of the pump boards 105. For example, the first pump board 105*a* may be different from the second pump board 105*b*.

The pump boards 105 can fluidically connect the sample channel 110 and the sample supplies 100, and can control the fluidic communication. The pump boards 105 can allow the sample supplies 100 to supply the samples to the sample channel 110 and/or receive the samples from the sample channel 110. For example, the pump boards 105 can open a valve and operate a pump to supply the samples from the sample supplies 100 to the sample channel 110. For example, the pump boards 105 can open a valve and operate a pump to receive the samples from the sample channel 110. In some examples, the pump boards 105 and/or the system 1 may include a pipe or a conveyer to connect the pump boards 105 to the sample supplies 100 and/or the sample channel 110.

The sample channel 110 may be or include a pipe (e.g., a metal pipe, a plastic pipe, a polyvinyl chloride pipe, etc.), a hose, a tube, a conveyer, or otherwise any physical space configured such that a sample can flow/move/reside therein and be processed. The sample channel 110 may include or be connected to various channel components to monitor/control movement of the sample therein. The channel components may be or include an air driven pump, an electrical pump, an auger, air driven solenoid valve, an electrical valve, a flowmeter, a filter, etc. The sample channel 110 may include or be connected to a processing device (e.g., the first device 115, the second device 120, the chemical reservoir 130, etc.). Although FIG. 1 shows the first device 115 and the system 1 may include any number of processing devices (one processing device, ten processing devices, etc.). In some examples, the system 1 may include a set of processing devices that are de-couplable such that processing devices (e.g., 115, 120) specific to the sample in the sample channel 110 can be installed.

The processing device (e.g., the first device 115, the second device 120, the chemical reservoir 130, etc.) may be or include any device configured to process samples in the sample supplies 100. For example, when the system 1 is used in semiconductor industry, the processing device may be or include any device configured to perform operations associated with semiconductor fabrication processes. For example, when the system 1 is used in food/beverage industry, the processing device may be or include any device configured to perform operations associated with food/beverage processing.

The processing device may be or include a plurality of devices (e.g., the first device 115, the second device 120). For example, the system 1 can include any number of processing devices, and shown in FIG. 1 is a non-limiting example. The first device 115 can be configured to perform a first process, and the second device 120 can be configured to perform a second process. In some examples, the first process may be identical to the second process. In some examples, the first process may be different from the second process. As discussed above, the system 1 may include any number of processing devices configured to perform any number of processes.

The first device 115 can "process" the samples in the sample channel 110. For examples, the first device 115 can alter a property of the sample in the sample channel 110. For examples, the first device 115 can determine (e.g., measure, detect, sense, test, or otherwise collect information about) a property of the sample in the sample channel 110. For example, the first device 115 can detect/monitor pH, refractive index, concentration, conductivity, temperature, flow rate, level, alkalinity, chlorine, chloride, turbidity, total organic carbon (TOC), phosphate, silica, adenosine triphosphate (ATP), mass, ammonia, boron, copper, etc. For example, the first device 115 may be an ion selective sensor, a colorimeter, a flow totalizer, a pH meter, a refractive index meter, a flow meter, a thermostat, a heater, etc. In some examples, an output of the first device 115 can generate a signal associated with the processing, and the signal may be analog or digital, ranging 4-20 mA for example, and 0-5 V or 0-10 V. The first device 115 may be disposed at a single location and can process the multiple samples. For example, the first device 115 can process a first sample from the first sample supply 100*a* and then process a second sample from the second sample supply 100*b* without changing the location. In some examples, the first device 115 can change a parameter or a threshold associated with the processing based on the sample in the sample channel 110.

The processing device connected to the sample channel 110 may be or include the chemical reservoir 130. The chemical reservoir 130 is a reservoir (or a container, a tank, a drum, or otherwise any source of chemical) to contain chemical (e.g., water, coolant, etc.) and can "process" the sample in the sample channel 110. For example, the chemical reservoir 130 can supply the chemical to the sample channel 110 thereby changing a property (e.g., physical, chemical) of the sample in the sample channel 110. For example, the chemical reservoir 130 may supply chemical to change a composition or a makeup of the sample in the sample channel 110. For example, the chemical reservoir 130 may supply chemical to change a concentration of the sample in the sample channel 110. In some examples, the chemical reservoir 130 may include a sensor configured to measure a level of chemical in the chemical reservoir 130. In some examples, the chemical reservoir 130 may include a pump board substantially similar to or identical to the pump boards 105. Although one chemical reservoir 130 is depicted, the chemical reservoir 130 may be or include any number of chemical reservoirs. For example, the chemical reservoir 130 may be a set of chemical reservoirs. For example, the chemical reservoir 130 may be a plurality of separate chemical reservoirs. In some examples, the chemical reservoir 130 may be a city water reservoir (e.g., supplying city water through a pipe).

The controller 125 is a processor or a software component installed on such a processor configured to control one or more of elements in the system 1. The controller 125 is connected to at least one of the sample supplies 100 or the pump boards 105 to control supply of the samples in the sample supplies 100. For example, the controller 125 can control the first pump board 105*a* to supply the first sample in the first sample supply 100*a* to the sample channel 110. For example, the controller 125 can control the first pump board 105*a* to discharge the first sample into the first sample supply 100*a*. For example, when the first pump board 105*a* is included in the first sample supply 100*a*, the controller 125 can control the first sample supply 100*a* to supply/discharge the first sample. The controller 125 may be connected to the processing devices (e.g., the first device 115, the second device 120, the chemical reservoir 130, etc.). In some examples, the controller 125 can control the first device 115 to process the sample in the sample channel 110. In some examples, the controller 125 may be connected to various components in the sample channel 110 (e.g., a valve, a flowmeter, a pump, etc.) and can control movement of the sample in the sample channel 110.

In some examples, the system 1 may be integrated in a control unit. For example, the control unit may include an electrical controller (e.g., the controller 125), a human-machine interface, the processing devices (e.g., the first device 115, the second device 120, the chemical reservoir 130, or controlling interface therefor, etc.) and various control/channel components including a pump (e.g., the pump boards 105 to control supply of samples, a pump for the chemical reservoir 130, etc.), a valve (e.g., a solenoid valve, etc. to control supply/flow of samples or chemical), and/or a pipe (e.g., piping for the sample channel 110, piping for connection between the sample channel 110 and the sample supplies 100, etc.). In some examples, the control unit may be mounted to a physical board.

In some examples, the controller 125 can receive information about the sample supplies 100 and/or the processing devices (e.g., the first device 115, the second device 120, and the chemical reservoir 130, and a reading value thereof). The controller 125 can collect information about a flow rate, a chemical level, a concentration, or any measurable attribute of the sample in the sample channel 110. The controller 125 can collect information about a flow rate, a chemical level, a concentration, or any measurable attribute of the sample in the sample supplies 100. The controller 125 can collect information about a flow rate, a chemical level, a concentration, or any measurable attribute of the sample in the chemical reservoir 130.

In some examples, the control unit may include an electrical enclosure, a controller (e.g., the controller 125), input/output cards, electrical terminal blocks, relays, power supply, sensors (e.g., any make, vendor, or model), signal converters, and associated wiring. In some examples, the control unit may include the pump boards 105, the first device 115, and the second device 120. For example, the control unit may include a sensor configured to detect/monitor a physical or a chemical property including but not limited to, pH, refractive index, conductivity, concentration, temperature, flow rate, flow, level, alkalinity, chlorine, chloride, certain ion, turbidity, TOC, phosphate, silica, ATP, mass, ammonia, boron, copper, etc.

In some examples, the controller 125 can be programmed to monitor and/or control connected components (e.g., the sample supplies 100, the pump boards 105, the first device 115, the second device 120, the chemical reservoir 130, etc.) by receiving/analyzing signals/data from a wide range of sources including electrical signals from standard intertrial sensors, industrial protocols such as Modbus, Profibus, BACnet, Profibus, OPCUA etc. or other sources that can be interpreted. In some examples, a hardware component of the controller 125 can be programmed or loaded with software. For example, the controller 125 may be a Digi Controller. The controller 125 may be programmed and/or controlled using any make, model, and any type of programing language.

In some examples, the controller 125 can remotely control processing devices (e.g., the first device 115, the second device 120, the chemical reservoir 130, the pump boards 105, the sample supplies 100, etc.). For example, the controller 125 can control via a wire communication, a wireless communication (e.g., Wi-Fi, Bluetooth, etc.) with any protocol (e.g., digital, analog, Modbus, TCP/IP, RS485, etc.).

In some examples, the controller 125 can execute an instruction or a sequence of instructions (or include a program or a software component to perform such instructions) to perform the cycle operation (e.g., processing samples, turning on/off cycle operations, controlling the processing devices, turning on/off the processing devices, etc.). The instruction may be or include a list of predefined parameters to perform the cycle operation. In some examples, the instruction may include a plurality of predefined parameters for one or more cycles (e.g., cycle 1, cycle 2, . . . , cycle N). In some examples, the instruction may include a plurality of recipes for one or more cycles (e.g., cycle 1, cycle 2, . . . , cycle N). For example, a non-limiting example instruction may be or include:

load a first set of parameters for cycle 1;

control the first pump board 105*a* to supply a first sample in the first sample supply 100*a* to the sample channel 110, based on one or more parameter in the first set of parameters;

control at least one of the first device 115, the second device 120, or the chemical reservoir 130 to process the first sample, based on one or more parameter in the first set of parameters;

control the first pump board 105*a* to discharge the first sample, based on one or more parameter in the first set of parameters;

unload the first set of parameters for cycle 1;

load a second set of parameters for cycle 2;

control the second pump board 105*b* to supply a second sample in the second sample supply 100*b* to the sample channel 110, based on one or more parameter in the second set of parameters;

control at least one of the first device 115, the second device 120, or the chemical reservoir 130, to process the second sample, based on one or more parameter in the second set of parameters;

control the second pump board 105*b* to discharge the second sample, based on one or more parameter in the second set of parameters; and unload the second set of parameters for cycle 2.

In some examples, the instruction may include a set of parameters to perform the cycle operation with N cycles. In some examples, when all the parameters are loaded to perform the cycle operation, the instruction may start over and repeat the cycle operation (e.g., a loop operation).

The instruction may include at least a value to control sequences and/or timing of the cycle operation. In some examples, the instruction may include a parameter associated with a delay time. For example, the instruction may include a parameter to control one of the pump boards 105 to supply a sample and delay a predetermined amount of time prior to controlling the processing device (e.g., the first device 115). For example, the instruction may include a parameter to delay a predetermined amount of time prior to repeating the cycling operation for a next sample supply.

In some examples, the controller 125 can selectively activate the processing device (e.g., the first device 115) based on a parameter in the instruction. For example, a first instruction for the first sample in the first sample supply 100*a* may include a first parameter to activate the first device 115, whereas a second instruction for the second sample in the second sample supply 100*b* may include a second parameter to activate the second device 120.

In some examples, based on a parameter in the instruction, the controller 125 can repeat the cycle operation for a predetermined number of sample supplies and a predetermined number of samples supplied by the predetermined number of sample supplies. For example, the instruction may include a set of parameters associated with a subset of the sample supplies 100 for which the controller 125 performs the cycle operation. For example, the controller 125 can perform the cycle operation for the first sample in the first sample supply 100*a* and the third sample in the third sample supply 100*c* based on the instruction that the controller 125 executes (or a set of predefined parameters therein). In some examples, the predetermined number may indicate that a number of sample to be processed is one, and the controller 125 can repeat the cycle operation for a sample supply and a sample supplied by the sample supply continuously without stopping.

In some examples, based on a parameter in the instruction, the controller 125 can repeat the cycling operation for a predetermined number of times for one of the sample supplies 100 (and the sample included therein). For example, the instruction may include a set of predefined parameters to perform the cycling operation for any number of times for the first sample in the first sample supply 100*a*.

In some examples, based on a parameter in the instruction, the controller 125 can repeat the cycling operation until a predefined condition is met. For example, the instruction may include a set of predefined parameters to repeat the cycling operation until a reading value of the first device 115 meets one of the predefined parameters or a predetermined threshold value.

In some examples, based on a parameter in the instruction, the controller 125 can repeat the cycling operation for the plurality of sample supplies 100 and the plurality of samples supplied by the plurality of sample supplies 100, until a shutdown condition is triggered. In some examples, the shutdown condition can be triggered by one or more parameters in the instruction. In some examples, the shutdown condition can be triggered based on an indication that a reading of the first device 115 is below or above a threshold value. In some examples, the shutdown condition can be triggered by a user. For example, the user 145 can control (e.g., remotely, on site, etc.) the controller 125 to stop the cycle operation.

In some examples, the controller 125 can selectively activate the first device 115 based on a reading from the second device 120.

In some examples, the controller 125 can send data to the user device 140 and/or the user 145 via the network 150. In some examples, the controller 125 can receive data or instructions from the user device 140 and/or the user 145 via the network 150. The user device 140 may be a smartphone, a tablet computer, a desktop computer, etc. The network 150 may be or include at least one wireless network, wired network, or combination of wireless and wired networks. The network 150 may include a Wi-Fi network, a wired Ethernet network, a Bluetooth network, and/or any other wireless/wired network configured to communicate data. For example, the network 150 may be a local area network or a wide area network (e.g., the Internet, a building WAN, etc.) and may use a variety of communications protocols (e.g., BACnet, IP, LON, etc.). In some examples, the user 145 can access the controller 125 via the network 150 to control the cycle operation and receive data associated with the samples and/or the cycle operation.

Through the network 150, the controller 125 or the control unit can send data to the user device 140 (or the user 145), the data associated with the sample in the sample channel 110 and/or the samples that the controller 125 has processed. In some examples, the controller 125 can send data to a cloud database. In some examples, the controller 125 can receive a reading from the first device 115, the reading associated with the sample in the channel, and send data including the reading to the user device 140. In some examples, the controller 125 or the first device 115 may be or include an internet-of-thing device, which can directly communicate data to the user device 140.

In some examples, the system 1 may be a first system, and can communicate with a second system (substantially similar or identical to the system 1). The second system may reside locally or offsite. The controller 125 can communicate data/information of the system 1 (e.g., the sample supplies 100, the first device 115, the chemical reservoir 130, etc.) to the second system. For example, such data/information can be communicated via electrical signals (e.g., voltage/current), Modbus, Message Queuing Telemetry Transport (MQTT), Open Platform Communications Unified Architecture (OPCUA), etc. Based on the communicated data/information, the second system can perform cycling operations or processing operations.

In some examples, the system 1 may include various control components and channel components in any portion that is connected to the controller 125. For example, the system 1 may include the control components including a pump, a valve, a solenoid valve, or any component configured to control movement of a sample. For example, the system 1 may include the channel components including a flowmeter, a sensor, a detector, or any component configured to monitor movement of a sample or a status of the sample channel 110.

Figure 2:
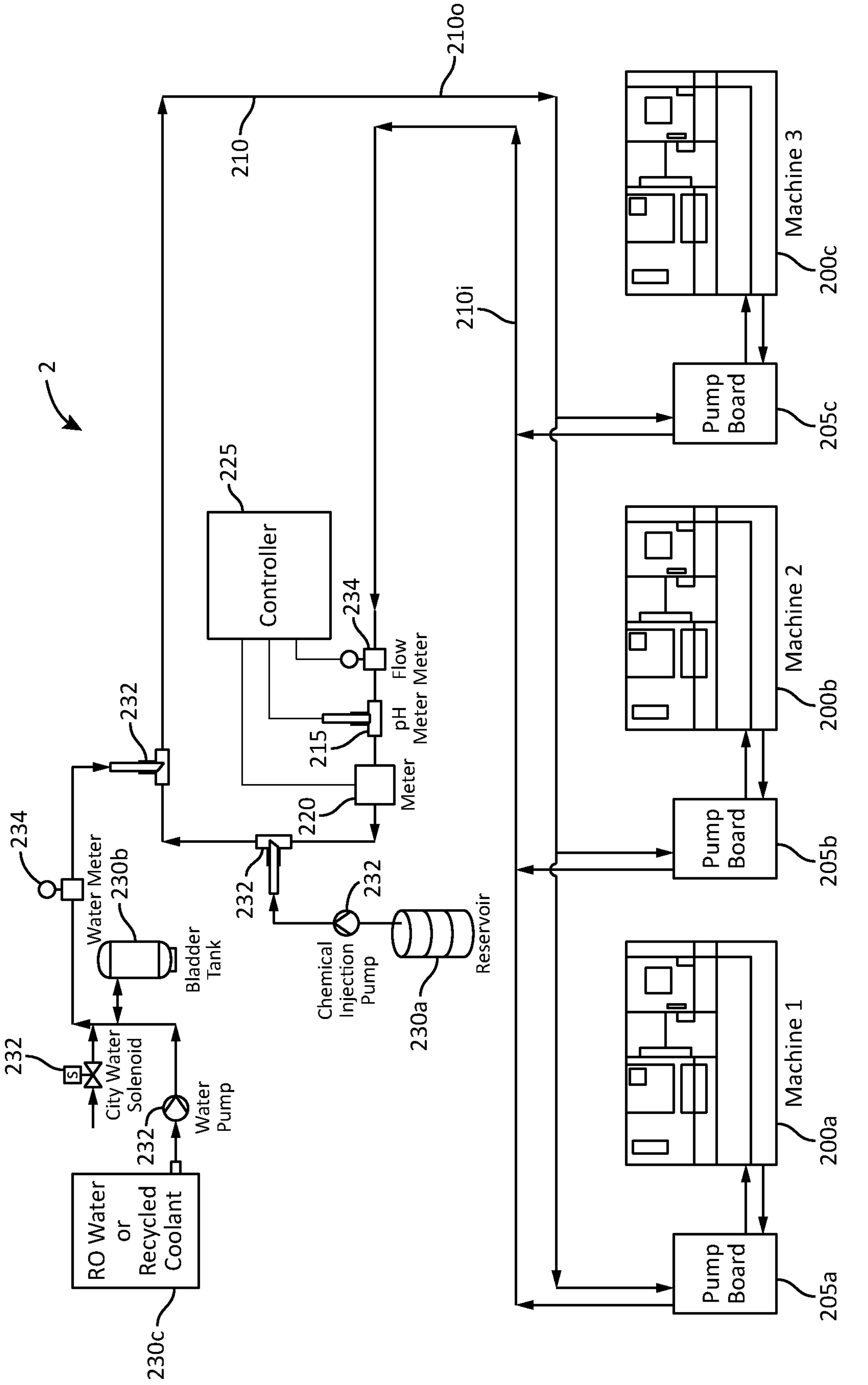
FIG. 2 depicts a system for processing samples, according to some examples.

FIG. 2 depicts a system 2 for processing samples, according to some examples. The system 2 may be an example system of the system 1. As shown in FIG. 2, the system 2 includes a first sample supply 200*a* and a first pump board 205*a* connected thereto, a second sample supply 200*b* and a second pump board 205*b* connected thereto, and a third sample supply 200*c* and a third pump board 205*c* connected thereto. The system 2 includes a sample channel 210, a first device 215, a second device 220, and chemical reservoirs 230. The system 2 includes a controller 225. The system 2 includes control components 232 and channel components 234.

The system 2 can be used to process any set of samples. In some examples, the first sample in the first sample supply 200*a* may be substantially similar or identical to the second sample in the second sample supply 200*b*. For example, the first sample and the second sample may share a same chemical composition and/or a same physical property. In some examples, the first sample in the first sample supply 200*a* may be different from the second sample in the second sample supply 200*b*.

In some examples, the sample channel 210 includes an inlet portion 210*i* and an outlet portion 2100. The inlet portion 210*i* can be connected to an outlet of each of the sample supplies 200 (or the pump boards 205), and the outlet portion 2100 can be connected to an inlet of each of the sample supplies 200 (or the pump boards 205). For example, the controller 225 can control the first pump board 205*a* to open the outlet of the first pump board 205*a* and can control the first sample supply 200*a* to supply the first sample through the outlet of the first pump board 205*a*, to the inlet portion 210*i* of the sample channel 210. For example, the controller 225 can control the first pump board 205*a* to open the inlet of the first pump board 205*a* and can control the first sample supply 200*a* to receive the first sample through the inlet of the first pump board 205*a*, from the outlet portion 2100 of the sample channel 210.

After the controller 225 detects that the sample channel 210 receives a sample, or based on the instruction including a set of predefined parameters, the controller 225 can operate the processing devices. In some examples, the controller 225 can operate the first device 215 (e.g., a pH meter) to measure pH of the sample in the sample channel 210. In some examples, the controller 225 can operate the second device 220 to measure a physical or a chemical property of the sample (e.g., refractive index, concentration, etc.). In some examples, the controller 225 can control the chemical reservoirs 230. For example, based on a reading value of the first device 215 and/or the second device 220, the controller 225 can control at least one of the chemical reservoirs 230 to inject chemical. In some examples, the controller 225 can control at least one of the chemical reservoirs 230 to inject chemical regardless of the reading value of the first device 215 and/or the second device 220. In some examples, the controller 225 can control at least one of the chemical reservoirs 230 to inject chemical based on the instruction or a parameter therein.

The system 2 may include the control components 232 such as a valve, a pump, a solenoid valve, an injection connector, etc. The control components 232 can control supply/movement of the sample and/or the chemical in the chemical reservoirs 230. For example, although not depicted, one or more of the control components 232 may be connected to the pump boards 205 and can control supply/movement of the sample. For example, one or more of the control components 232 may be connected to the chemical reservoir 230*a* and control supply/movement of the chemical in the chemical reservoir 230*a*. For example, one or more of the control components 232 may be connected to the chemical reservoir 230*b* and control supply/movement of the chemical in the chemical reservoir 230*b*. For example, one or more of the control components 232 may be connected to the chemical reservoir 230*c* and control supply/movement of the chemical in the chemical reservoir 230*c*.

The system 2 may include the channel components 234 such as a water meter, a flow meter, etc. For example, the channel components 234 can monitor movement of the sample in the sample channel 210 or a status of the sample channel 210. For example, the channel components 234 can monitor movement of the chemical injected to the sample channel 210 or a status of a channel used for the injection.

The controller 225 can perform a cycle operation for multiple samples (e.g., the multiple samples in the sample supplies 200). Non-limiting examples of the cycle operation may be as follows. The controller 225 controls (e.g., turn on) the first pump board 205*a*. The first pump board 205*a* introduces the first sample in the first sample supply 200*a* into the sample channel 210 (e.g., pipes, hoses, etc.). The controller 225 controls the first device 215 and the second device 220 to test chemical levels of the sample in the sample channel 210, and compares results of the chemical levels to thresholds. In some examples, the controller 225 can test chemical levels after waiting for a first predetermined amount of time (e.g., 1 minute, 5 minutes, etc.) to flush the sample channel 210. In some examples, the controller 225 may oversee or obtain information about the sump level of the sample and/or the sample supplies 200. The controller 225 then controls the chemical reservoirs 230 and add chemical (e.g., coolant, water, or recycled coolant, etc.) to the sample in the sample channel 210, to adjust a concentration or of the sample or fill the sump. The controller 225 flushes the sample channel 210 back to the first sample supply. In some examples, the controller 225 waits for a second predetermined amount of time (e.g., 1 minute, 5 minutes, etc.) to flush the sample channel 210 to ensure any addition from the 230 reservoirs are flushed back into the sample supplies 200. In some examples, the controller 225 can collect information about the first sample and send the data to a cloud database or a user device. The controller 225 then can move on to the next sample (e.g., the second sample in the second sample supply 200*b*). The cycle operation discussed herein is a non-limiting example, and may vary based on the instruction or a set of predefined parameters therein.

Figure 3:
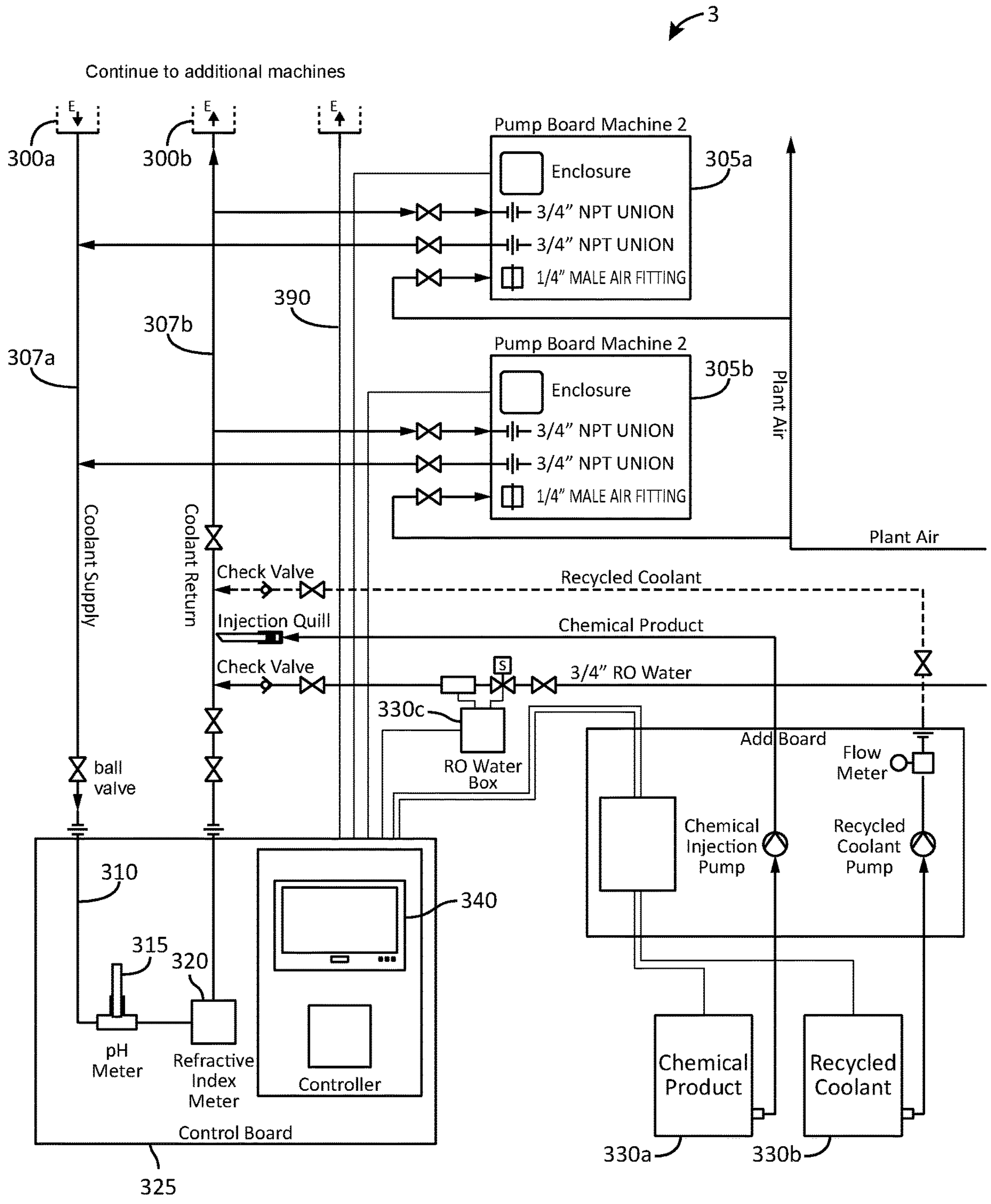
FIG. 3 depicts a system for processing samples, according to some examples.

FIG. 3 depicts a system 3 for processing samples, according to some examples. The system 3 may be an example system of the system 1. The system 3 includes a control unit 325 (or sometimes referred to as a control board), pump boards 305, connecting components 307, a sample channel 310, a first device 315, a second device 320, and chemical reservoirs 330. The control unit 325 is connected to a sample-in portion 300*a* and a sample-out portion 300*b*. The system 3 may include various control components (e.g., similar to control components 232) and channel components (e.g., similar to channel components 234). For example, as shown in FIG. 3, the system 3 includes valves, pumps, flowmeters, etc.

The sample-in portion 300*a* may be an output portion of a sample supply (e.g., one of the sample supplies 100). The sample-out portion 300*b* may be an input portion of a sample supply (e.g., one of the sample supplies 300). The pump boards 305, the sample channel 310, the first device 315, the second device 320, and the chemical reservoirs 330 may be substantially similar to or identical to the pump boards 105, the sample channel 110, the first device 115, the second device 120, and the chemical reservoir 130, respectively. The connecting components 307 may be any mechanical components configured to deliver samples. For example, the connecting components 307 may be a pipe (e.g., a metal pipe, a plastic pipe, a polyvinyl chloride pipe, etc.), a hose, a tube, a conveyer, or otherwise any physical space configured such that a sample can move therein. In some examples, the connecting components 307 may be part of the control unit 325 (e.g., as part of the sample channel 310).

The control unit 325 may include the sample channel 310, a controller (e.g., the controller 125), a display, the first device 315, the second device 320, etc. The control unit 325 may include or be connected to various control components and channel components. The control unit 325 can receive a sample from the sample-in portion 300*a* through the connecting portion 307*a*. In some examples, the connecting components 307 may be connected to the pump boards 305, which can control movement of the sample in the connecting components 307. For example, the pump boards 305 can control introducing a sample into the sample channel 310. For example, the pump boards 305 can control discharging the sample from the sample channel 310. The sample then travels via the sample channel 310 to the first device 315 and the second device 320, which can test the sample. The control unit 325 can interpret the results e.g., test results of the first device 315 and the second device 320. In some examples, the control unit 325 can act upon the results by injecting chemical in the chemical reservoirs 330 into the sample channel 310. The sample continues to travel back to the pump boards 305 via the sample channel 310 and is discharged into the sample supplies 300 (e.g., the sample supply that the sample originated).

The control unit 325 can control the processing devices (e.g., the first device 315, the second device 320, the chemical reservoirs 330, etc.) to process the sample in the sample channel 310. For example, the control unit 325 can control the first device 315 to measure pH of the sample in the sample channel 310. For example, the control unit 325 can control the second device 320 to measure a refractive index of the sample in the sample channel 310. In some examples, based on the measurement, the control unit 325 can control other processing devices (e.g., the chemical reservoirs 330). For example, the control unit 325 can control one of the chemical reservoirs 330 to inject chemical (e.g., a chemical product, recycled coolant, water, etc.) into the sample channel 310 or into the connecting component 307*b* (or the sample channel 310) depending on the measurement.

The sample processed by the processing devices (e.g., the first device 315, the second device 320, the chemical reservoirs 330, etc.) can be discharged through the connecting component 307*b* (or the sample channel 310), to the sample-out portion 300*b*.

In some examples, the control unit 325 may include a display 340 to show a visualized status of the system. The control unit 325 can control such a display device (e.g., the display 340) to show any information about the sample supplies, the pump boards, the processing devices, etc. For example, a dashboard of the display 340 can display a report shown in FIG. 5-FIG. 11 or information included in the report.

As shown in FIG. 3, the system 3 can include an electrical connection 390 (e.g., an electrical cable) to connect various components. The electrical connection 390 can connect the control unit 325 with various components including processing devices (e.g., the first device 315, the second device 320, the chemical reservoirs 330, etc.) to control the same.

FIG. 4 depicts an example application of the controller shown in FIG. 1, according to some examples. The controller 125 can generate an alarm associated with any of the system 1 (e.g., the sample supplies 100, the sample in the sample channel 110, the first device 115, etc.). For example, the controller 125 can generate an alarm responsive to an indication that a value associated with the sample in the sample channel 110 is higher or lower than a threshold value. In some examples, the controller 125 can generate an alarm and send to the user device 140 (e.g., a display of a desktop computer or a tablet computer, etc.) and the user 145 (e.g., text message, email, etc.). For example, the controller 125 can send an alarm via the network 150. For example, the controller 125 can send an alarm to a computer connected to the system 1 or the controller 125.

Referring to FIG. 4, the controller 125 can generate and/or send an alarm based on alarm setup table 410 stored in a memory device connected to the controller 125 or included in the controller 125. The alarm setup table 410 may include various types of fields associated with the system 1, including items 412, options 414, and description 416. The items 412 may be a list of alarms. The alarms may be associated with any of the system 1, including the sample in the sample channel 110, the sample supplies 100, the first device 115, channel components, control components, etc. The controller 125 can generate an alarm associated with one or more of the items 412 when the controller 125 detects that a corresponding condition in the description 416 is met.

For example, the items 412 may include, but not limited to, pH low level alarm, pH high level alarm, concentration low alarm, concentration high alarm, temperature low alarm, temperature high alarm, makeup use over max, product use over max, high dropline usage, low flow alarm, data age, calibration, emergency high usage, low chemical level, etc. For example, the controller 125 can generate a "pH low level" alarm when the controller 125 detects pH of the sample in the channel is low. For example, the controller 125 can generate a "pH high level" alarm when the controller 125 detects pH of the sample in the sample channel 110 is high. For example, the controller 125 can generate a "concentration low" alarm when the controller 125 detects a concentration of the sample in the sample channel 110 is low. For example, the controller 125 can generate a "makeup use over max" alarm when the controller 125 detects that chemical (e.g., water) product is used more than daily allowance. For example, the controller 125 can generate a "low flow" alarm when the controller 125 detects malfunctioning of a pump or an associated component or when the controller 125 detects a low flow. For example, the controller 125 can generate a "data age" alarm when the controller 125 detects that no data has been sent to a database (e.g., a cloud database, a networked database, etc.) in a predefined amount of time (e.g., 4 hours). For example, the controller 125 can generate a "low chemical level" alarm when the controller 125 detects that a level of chemical in the chemical reservoir 130 is low.

The controller 125 can take one or more actions based on the options 414. The options 414 may include actions to be taken when the condition in the description 416 is met. In some examples, the options 414 may include "text," "immediate text," "email," "immediate email," and "daily summary." For example, when the controller 125 generates an "concentration low" alarm responsive to a concentration of the sample being low, the controller 125 can send the alarm (e.g., via a text 418 and an email 420) to the user 145. The controller 125 can include a daily summary with the alarm. For example, when the controller 125 generates an "low chemical" alarm responsive to a level of the chemical being low, the controller 125 can send the alarm (e.g., via the email 420, a schedule email, etc.) to the user 145 or a supplier. The controller 125 can include a daily summary with the alarm.

In some examples, the alarm (e.g., the text 418, the email 420, etc.) may include actionable item. For example, when the controller 125 generates an "low chemical" alarm responsive to a level of the chemical being low and the controller 125 sends the alarm (e.g., via the email 420) to a supplier, the alarm (e.g., the email 420) may include an order for the chemical so that the supplier can provide the chemical.

Still referring to FIG. 4, the controller 125 (or a control unit) can generate a report based on a database. The controller 125 can generate a database by collecting information about the system (e.g., 1) or components thereof (e.g., processing devices, sample supplies, chemical reservoirs, sample channel, etc.) on a local data storage and/or on a cloud service. In some examples, the database can be generated when data is sent to the controller, the database, the cloud database, and/or a user. Based on the generated database, the controller 125 (or a control unit, a cloud server, etc.) can create a report.

In some examples, the system 1 can perform two-step processing. As a first step, a controller (e.g., the controller 125) can collect data (e.g., a reading value of processing devices) and send to a cloud service for a second step processing. As discussed above, the first step may include managing parameters (or their lists) for cycle operations (e.g., controlling pump boards to collect samples, controlling processing devices to execute evaluation, opening/closing valves, executing timers, dispensing chemicals, etc.). The first step may include evaluating alarm conditions and controlling local alarming (e.g., via a physical LED or horn). To perform a second step processing, the controller can send a report to a cloud server (and/or text, email, etc.), the report including a set of data associated with a specific cycle (or entire cycle operations) and a list of alarms that were activated (and/or actions taken to address the alarms). In some examples, the controller can send a report to a list of users. As a second step, a cloud server can evaluate data from the controller. For a specific cycle that needs an immediate action, the cloud server can communicate an alarm to a user and/or the system 1. In some examples, a user can customize configuration of the table 410 to customize alarming options.

FIG. 5-FIG. 11 depict example applications of the controller shown in FIG. 1, according to some examples. The controller 125 can generate various reports associated with any of the system 1. Shown in FIG. 5-FIG. 11 are non-limiting examples of various reports. In some examples, various types/platforms for reports may be used (e.g., Microsoft PowerBI, Ignition, Metasis, Tableau, etc.).

In some examples, the controller 125 can generate a report associated with the sample in the sample channel 110, the sample channel 110, the samples in the sample supplies 100, the first device 115, the chemical in the chemical reservoir 130, etc. For example, the controller 125 can generate a report that includes a concentration of a sample, pH of a sample, a temperature of a sample, a level of a sample in the sample channel 110, a level of a sample in the sample supplies 100, a level of chemical in the chemical reservoir 130, an alarm status, usage data (e.g., coolant consumption, chemical consumption, sample consumption, water consumption, recycled coolant consumption, etc.), cost tracking data, etc. The controller 125 can generate a report and present on a display device (e.g., of the user device 140, of a desktop monitor connected to the controller 125, etc.). In some examples, the controller 125 can communicate a report associated with the system 1 or a piece of information in the report with the user 145, for example, via a phone call, a computer, or a human-machine interface. For example, the controller 125 can initiate an immediate alarm when the controller 125 detects that any element of the system 1 is in an out-of-specification condition.

Figure 5:
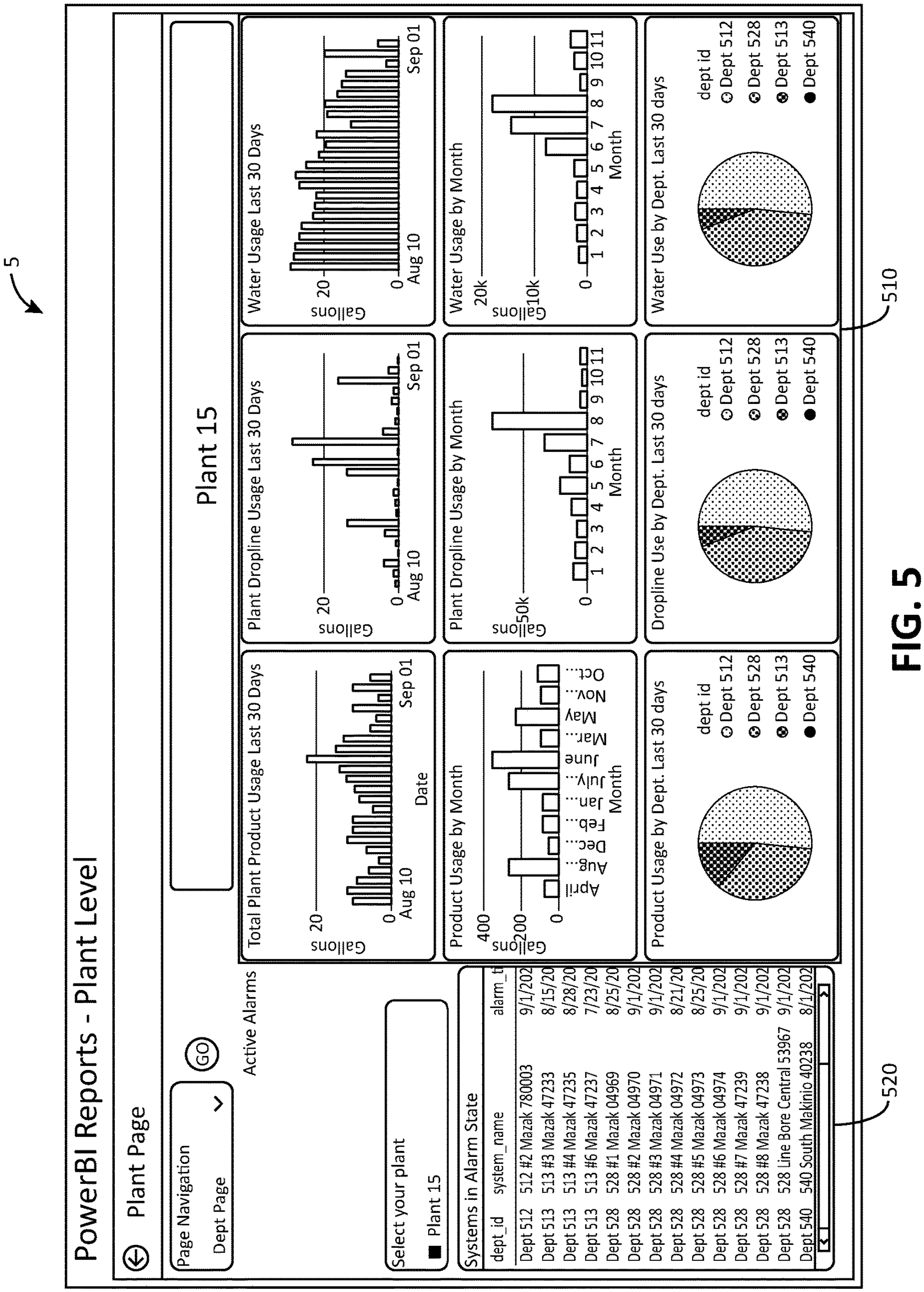
FIG. 5 depicts an example application of the controller shown in FIG. 1, according to some examples.

Referring to FIG. 5, the controller 125 can generate an example report 5 and present on a display device (e.g., of the user device 140, of a desktop monitor connected to the controller 125, etc.). The report 5 may include a status window 510. The status window 510 can show various types of data associated with the system 1. In some examples, the status window 510 can present data for a certain amount of time, timeseries data, real-time data, etc. For example, as shown in FIG. 5, the status window 510 may include a total plant product usage for the last 30 days, a plant dropline usage for the last 30 days, a water usage for the last 30 days, or such usage data for any amount of time. For example, as shown in FIG. 5, the status window 510 may include a product usage by month, a plant dropline usage by month, a water usage by month, or such data sorted by any time amount. For example, as shown in FIG. 5, the status window 510 may include a product usage by department for the last 30 days, a dropline usage by department for the last 30 days, a water usage by department for the last 30 days, or such data sorted by any sub-category for any time amount.

In some examples, the report 5 may include an alarm window 520. The alarm window 520 can present a list of alarms. The list of alarms may include alarms that have been triggered, addressed, or otherwise that need attention. For example, as shown in FIG. 5, the alarm window 520 may include alarms, departments associated with the alarm, and the time on which the alarms were triggered. It should be understood that the report 5 and following example reports shown in FIG. 6 to FIG. 11 are non-limiting examples of a report, and a report can include any information associated with the system (e.g., 1) and components thereof and can be customized based on the sample to process, the customer, types of process, etc.

Figure 6:
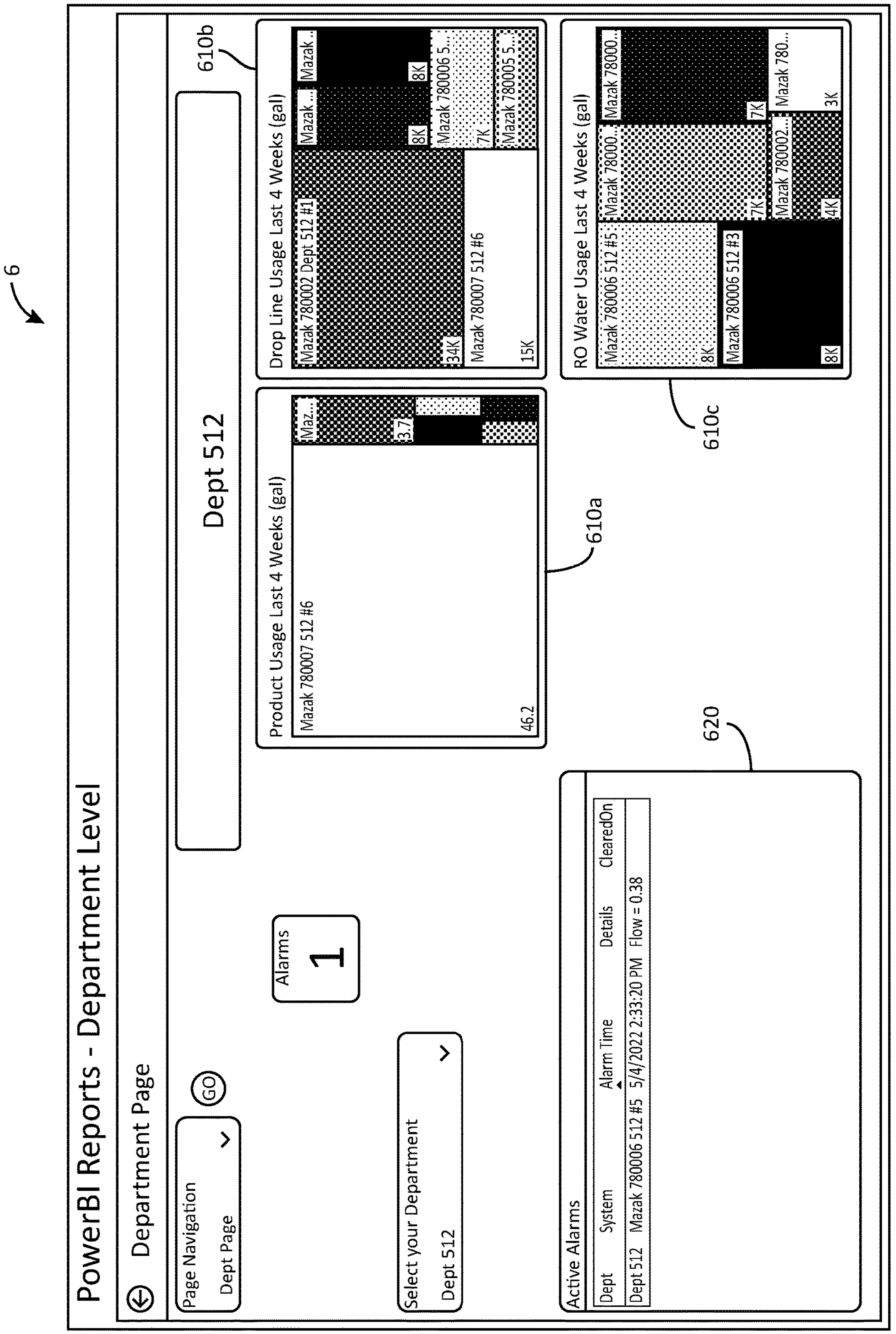
FIG. 6 depicts an example application of the controller shown in FIG. 1, according to some examples.

Referring to FIG. 6, the controller 125 can generate an example report 6 and present on a display device (e.g., of the user device 140, of a desktop monitor connected to the controller 125, etc.). The report 6 may include an alarm window 620. The alarm window 620 may be substantially similar to or identical to the alarm window 520. For example, the alarm window 620 may be a list of active alarms (e.g., the alarm window 520 sorted for active alarms).

In some examples, the report 6 may include status windows 610. The status windows 610 may include a plurality of status windows (e.g., 610*a*, 610*b*, 610*c*). Each of the status windows 610 may present different information associated with the system 1. In some examples, the first status window 610*a* can show a product usage for a certain amount of time (e.g., 4 weeks). For example, the product usage may include a usage of each of multiple samples (e.g., the multiple samples in the sample supplies 100) in a cycle operation. In some examples, the second status window 610*b* can show a drop line usage for a certain amount of time (e.g., 4 weeks). In some examples, the third status window 610*c* can show a water usage for a certain amount of time (e.g., 4 weeks). For example, the water usage may include an amount of water used for each of multiple samples (e.g., the multiple samples from the sample supplies 100) in a cycle operation.

Figure 7A:
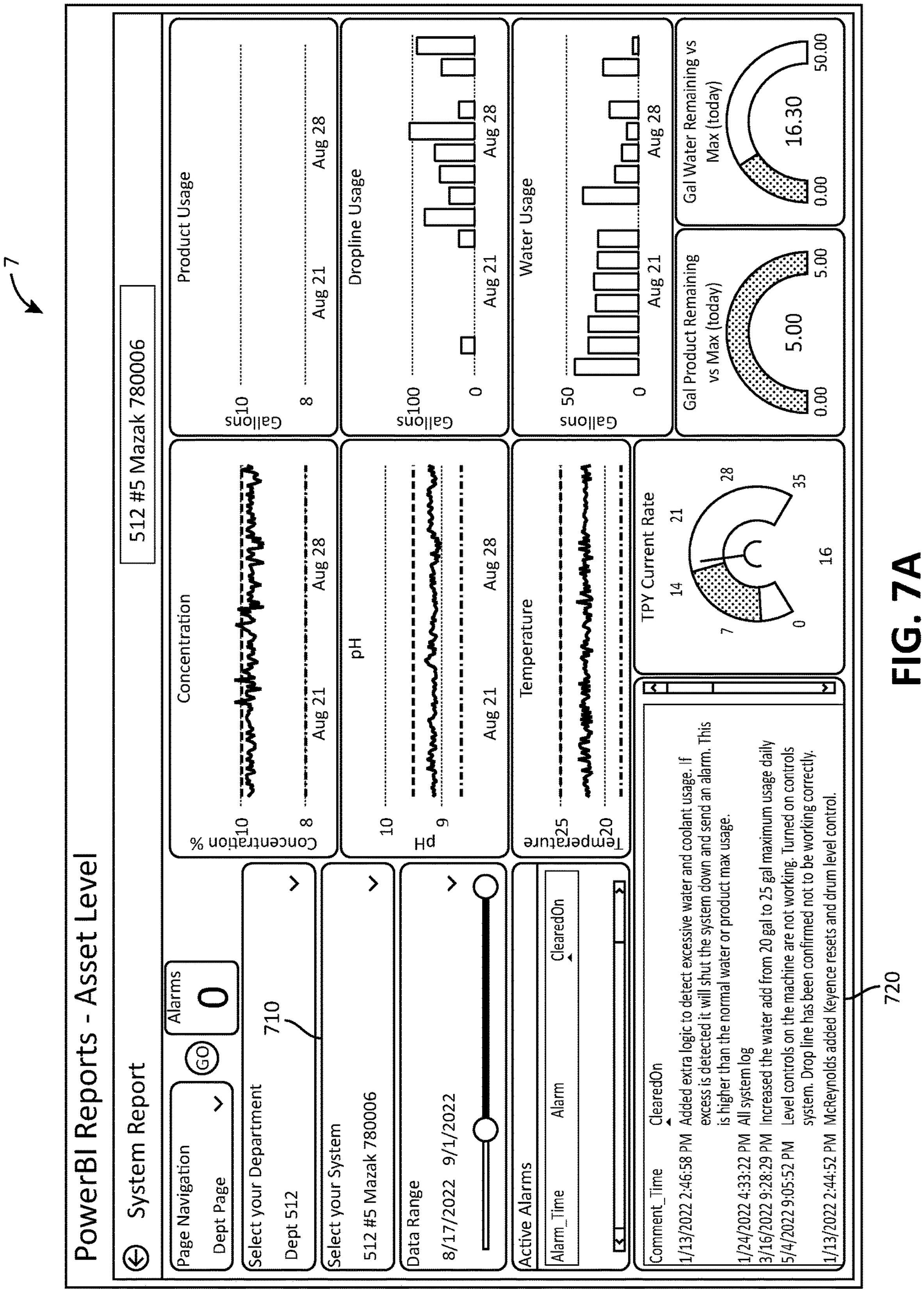
FIG. 7A and FIG. 7B depict an example application of the controller shown in FIG. 1, according to some examples.
Figure 7B:
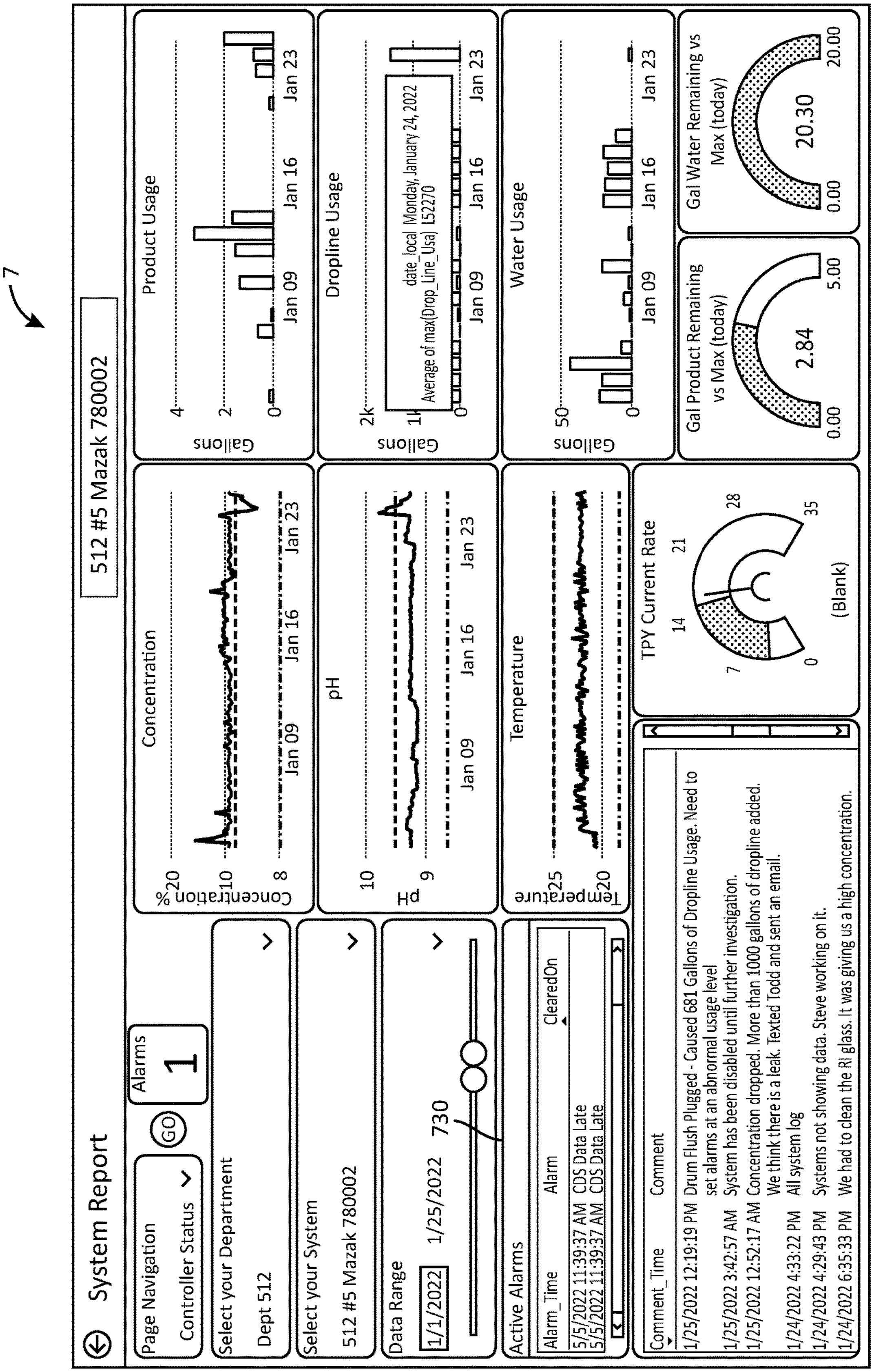

Referring to FIG. 7A and FIG. 7B, the controller 125 can generate an example report 7 and present on a display device (e.g., of the user device 140, of a desktop monitor connected to the controller 125, etc.). The report 7 may include a selection window 710 to select one or more samples of multiple samples (e.g., samples from the sample supplies 100) and to present data focusing on the selected samples. In some examples, the report 7 can present detailed information about the selected samples. As shown in FIG. 7A, the report 7 includes information about a selected sample, the information including a concentration, a product usage, pH, a dropline usage, a temperature, a water usage, a turns per year (TPY) current rate, a product remaining per the maximum volume, etc. The report 7 can select a certain amount of time to present (e.g., data range). The report 7 can show a list of active alarms associated with the selected sample. In some examples, the controller (e.g., the controller 125) can determine control actions based on data in the report (e.g., data stored in a database). For example, the controller 125 can determine, based on the data (e.g., TPY), if a sample is being used too little or too much compared to industry standards. In response to a determination, the controller 125 can determine a control action and/or inform a user of the determination.

In some examples, the report 7 can include a comment window 720, as shown in FIG. 7. The comment window 720 may include a list of comments that a user (e.g., the user 145) or the system 1 made. For example, when the user 145 of the system 1 manually controls any of the system 1, the user 145 can add a comment to the comment window 720. For example, when the controller 125 of the system 1 detects a certain event, the controller 125 can add a comment to the comment window 720. In some examples, the user 145 can add a comment by a phone call, a human-machine interface, or any other ways to input data on the system 1. In some examples, the comment may be a picture, a text, a number, a binary large object (BLOB), etc.

Referring to FIG. 7B, the report 7 can show an active alarm in an alarm window 730. When the controller 125 detects an alarm condition and generates an alarm, the alarm status can be shown in the alarm window 730. For example, when the controller 125 detects that a concentration of a sample dropped, pH of the sample went up, or a dropline coolant usage was high, the alarm window 730 can list the alarms. In some examples, the alarm window 730 can include a potential solution to address the alarms. In some examples, the controller 125 can send a message (e.g., text, email, phone call, etc.) associated with the alarms to the user 145. For example, the controller 125 can generate a work ticket so that the user 145 can inspect the system 1.

Figure 8:
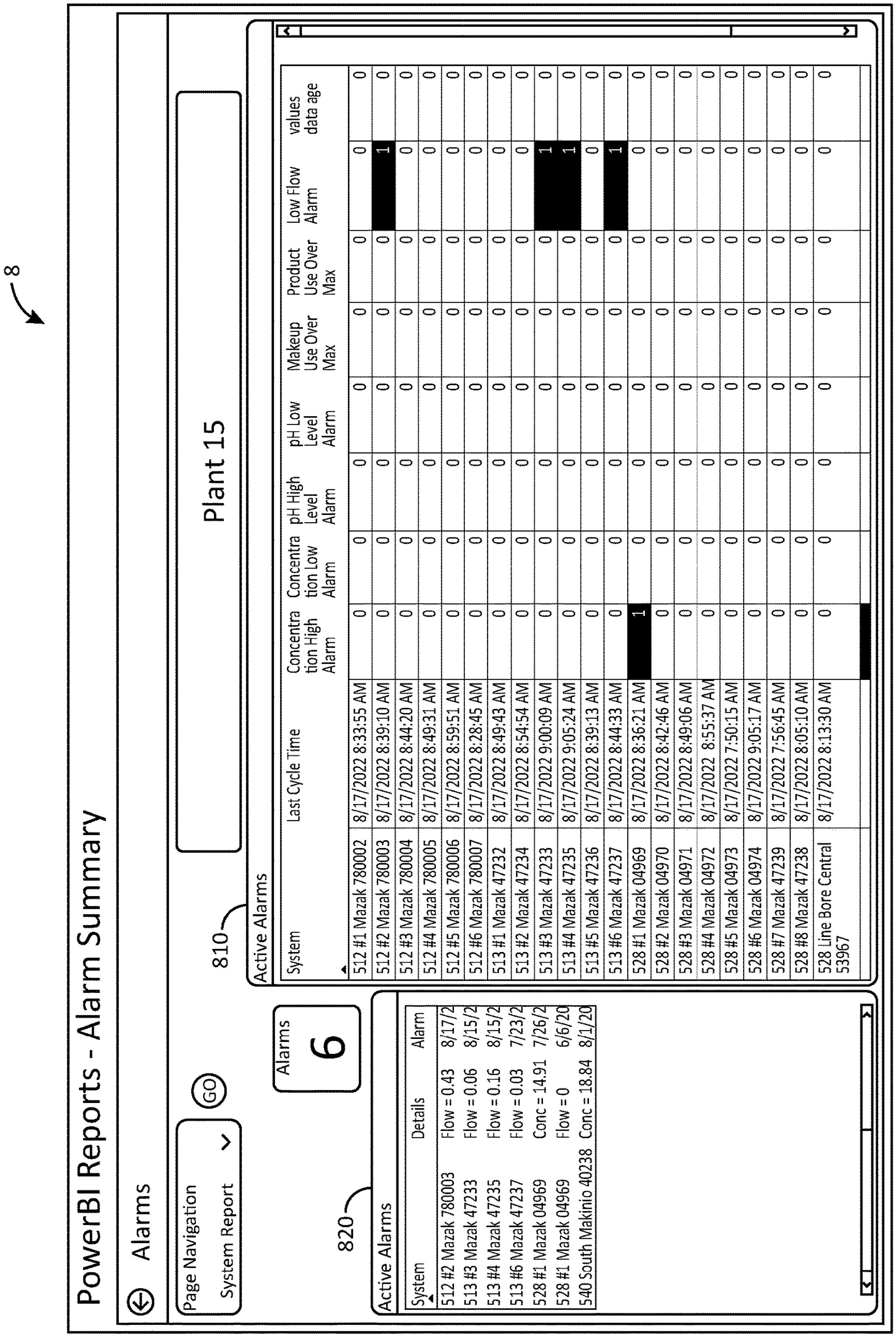
FIG. 8 depicts an example application of the controller shown in FIG. 1, according to some examples.

Referring to FIG. 8, the controller 125 can generate an example report 8 and present on a display device (e.g., of the user device 140, of a desktop monitor connected to the controller 125, etc.). The report 8 may include a list of alarms for a plurality of samples (e.g., the multiple samples from the sample supplies 100). In some examples, the report 8 may include an alarm window 810 and an active alarm window 820. The alarm window 810 can list all samples that the system 1 operates to control and respective cycle times. The alarm window 810 can include a list of alarms that may be triggered for each of the samples. For example, the alarm window 810 can list the alarms in the items 412. As shown in FIG. 8, the alarm window 810 can highlight items ("1") for the active alarms. In some examples, the report 8 can include the items for the active alarms in the active alarm window 820.

Figure 9:
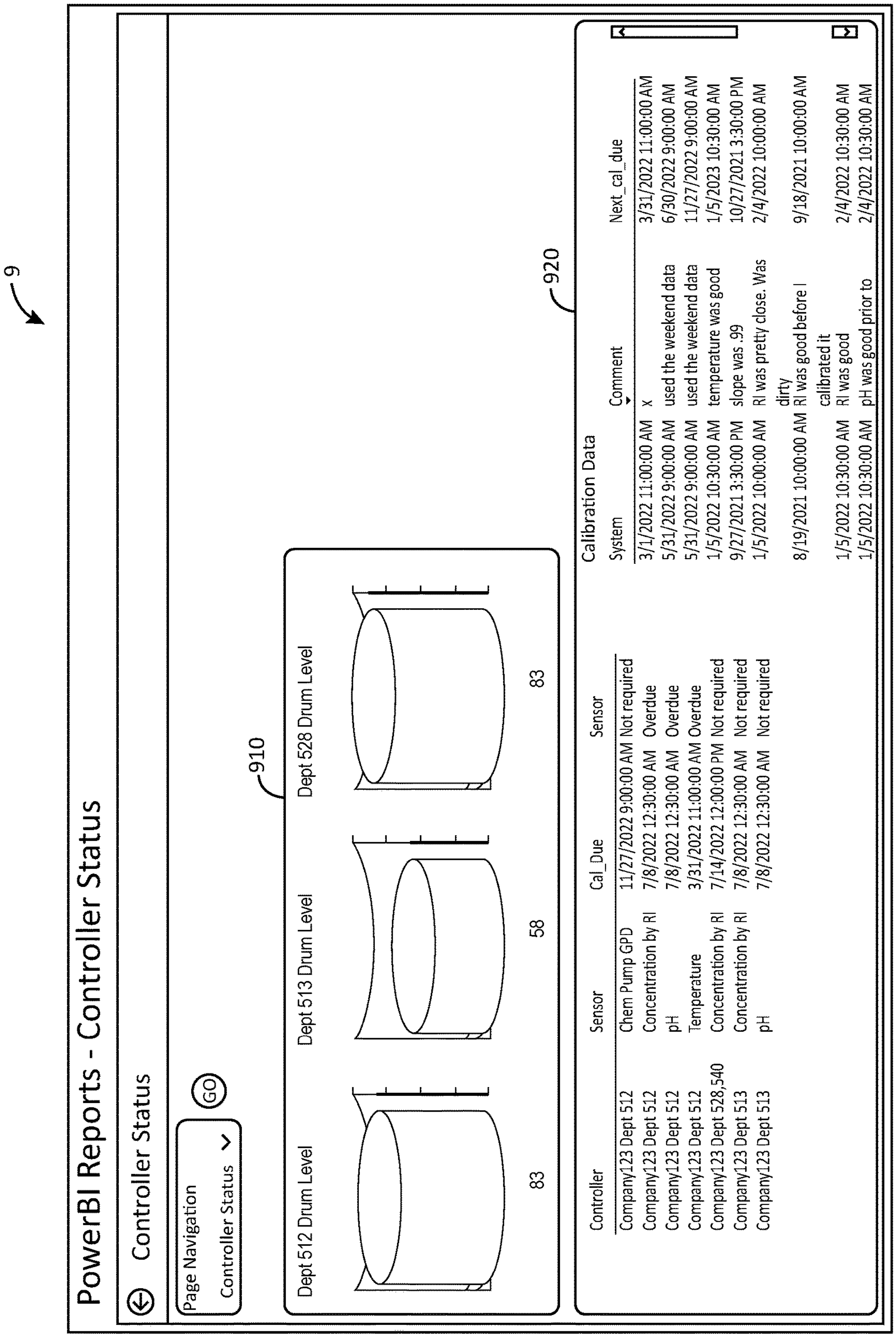
FIG. 9 depicts an example application of the controller shown in FIG. 1, according to some examples.

Referring to FIG. 9, the controller 125 can generate an example report 9 and present on a display device (e.g., of the user device 140, of a desktop monitor connected to the controller 125, etc.). The report 9 may include status data about the controller 125, processing devices (e.g., the first device 115, the second device 120, the chemical reservoir 130, etc.). In some examples, as shown in FIG. 9, the report 9 may include a first device window 910 indicating a status of a device connected to the controller 125 (e.g., the chemical reservoir 130) and a second device window 920 indicating a status of another device connected to the controller 125 (e.g., the first device 115). For example, the first device window 910 indicates a level of amount of chemical in the chemical reservoir 130 in each department. For example, the second device window 920 indicates a list of processing devices (e.g., the first device 115, the second device 120, etc.) and their operation status (e.g., if calibration is required). For example, the second device window 920 may include data associated with calibration that has been performed on the processing devices listed in the second device window 920.

Figure 10:
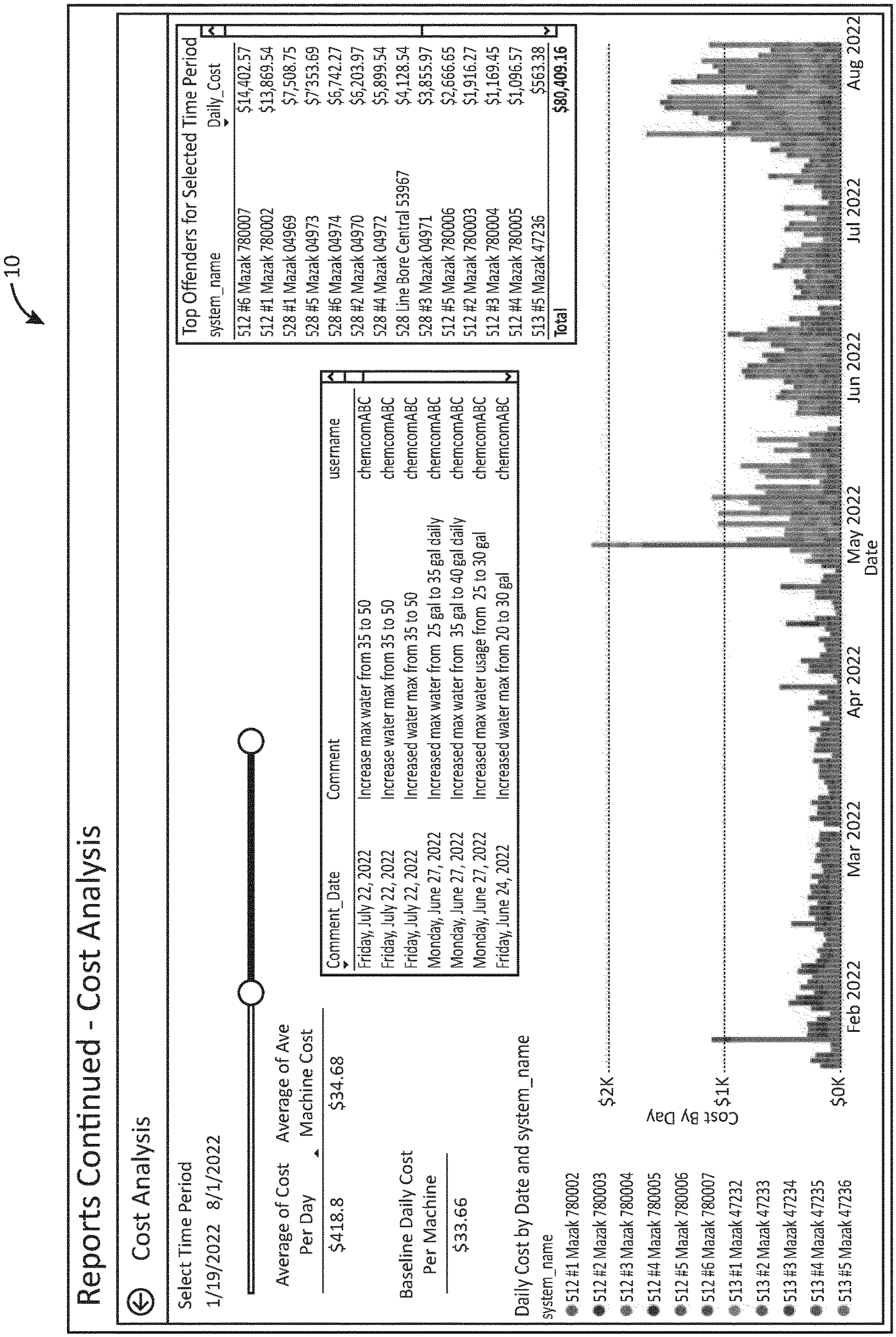
FIG. 10 depicts an example application of the controller shown in FIG. 1, according to some examples.

Referring to FIG. 10, the controller 125 can generate an example report 10 and on a display device (e.g., of the user device 140, of a desktop monitor connected to the controller 125, etc.). In some examples, the controller 125 can perform cost analysis based on data associated with the system 1 and generate the report 10. For example, the controller 125 can calculate cost by samples, date, process, time, etc., and present a summarized report for multiple samples (e.g., the report 10). In some examples, the controller 125 can generate an alarm based on the cost analysis and/or the report 10. For example, when the controller 125 identifies that a cost (e.g., an amount of coolant usage, cost therefor, etc.) associated with a sample in the system 1 is or is expected to be above, the controller 125 can generate an alarm and/or send the alarm to the user 145. In some examples, the controller 125 can interface with purchasing software to predict product depilation and order requirements. In some examples, the controller 125 can perform cost analysis to the asset level for budgeting purposes and cost analysis to the asset level.

Figure 11:
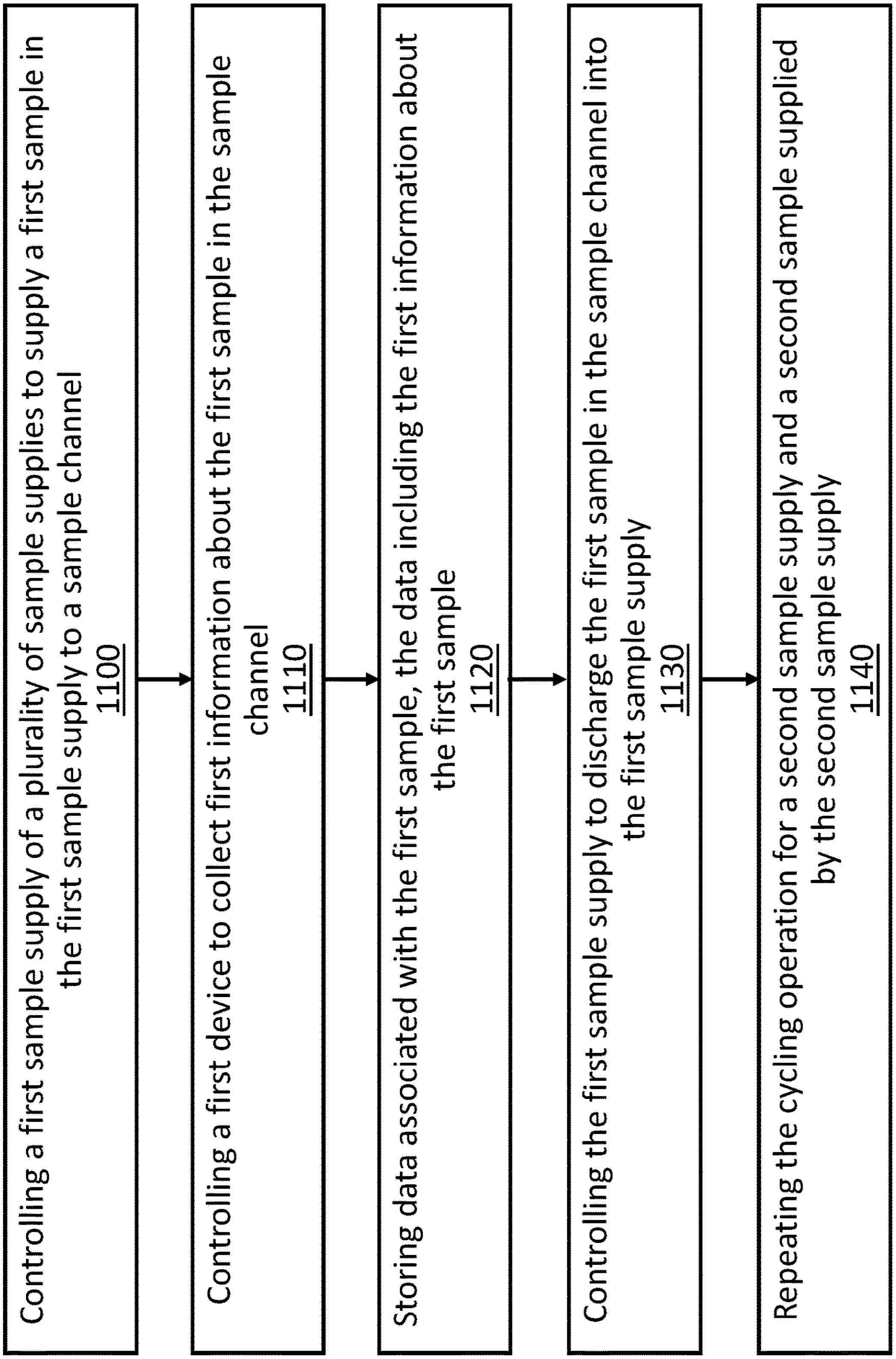
FIG. 11 depicts a flowchart of a method for processing samples, according to some examples.

FIG. 11 depicts a flowchart of a method 11 for processing samples, according to some examples. Any of the method 11 can be performed by any of systems and/or components discussed with respect to FIG. 1-FIG. 3, but any systems and/or components for processing samples can be used to perform at least a portion of the method 11 described herein. For example, any controller or control unit (e.g., the controller 125) can be used to perform at least a portion of the method 11.

The method 11 includes operation 1100 of controlling a first sample supply of a plurality of sample supplies to supply a first sample in the first sample supply to a sample channel. The method 11 includes operation 1110 of controlling a first device to collect first information about the first sample in the sample channel. The method 11 includes operation 1120 of storing data associated with the first sample, the data including the first information about the first sample. The method 11 includes operation 1130 of controlling the first sample supply to discharge the first sample in the sample channel into the first sample supply. The method 11 includes operation 1140 of repeating the cycling operation for a second sample supply and a second sample supplied by the second sample supply.

The method 11 may begin with the operation 1100 of controlling a first sample supply of a plurality of sample supplies to supply a first sample in the first sample supply to a sample channel. In some examples, the operation 1100 may include receiving data from the plurality of sample supplies, and controlling the first sample supply to provide the first sample to the sample channel. In some examples, the operation 1100 may include controlling a pump board connected to the sample supply. For example, the operation 1100 may include controlling the pump board to control a pump associated with the pump board, a valve associated with the pump board, thereby controlling supply of the sample. In some examples, the operation 1100 may include determining a system/cycle to begin running. For example, the operation 1100 may include determining a status (e.g., disabled or not, offline or online, etc.) of each sample supply and processing devices, and determining a system/cycle/sample to process based on a determination of the status. In some examples, the operation 1100 may include dwelling a certain amount of time to ensure that the sample channel is flushed and that the sample to be processed is obtained. For example, the operation 1100 may include detecting a property of the sample and/or a status of the sample channel to determine that the sample to be processed is obtained.

The method 11 can continue to the operation 1110 of controlling a first device to collect first information about the first sample in the sample channel. In response to a determination that the sample to be processed is obtained (e.g., within the sample channel) and/or a determination that a dwell time is finished, the method 11 can continue to controlling a processing device to process the sample in the sample channel. For example, the processing device may be or include the first device 115, the second device 120, the chemical reservoir 130, etc.

The method 11 can continue to the operation 1120 of storing data associated with the first sample, the data including the first information about the first sample. In some examples, the operation 1120 may include storing data associated with the sample in the sample channel, the data obtained from the processing device (e.g., the first device 115, etc.). In various examples, the operation 1120 may include various operations associated with the data associated with the samples. In some examples, the operation 1120 may include performing an evaluation of the sample based on the collected data. For example, the operation 1120 may include tracking and recording data associated with a characteristic of the sample and/or the system. For example, the operation 1120 may include analyzing the data to evaluate the sample and/or the system. In some examples, the operation 1120 may include publishing the data in a usable fashion (e.g., transmitting the data to a cloud service, a database, logs, etc.). In some examples, the operation 1120 may include presenting on a user device (e.g., a display) the data associated with the sample. In some examples, the operation 1120 may include determining an action based on an analysis of the data associated with the sample. For example, the operation 1120 may include opening/closing a valve, turning on/off a pump to add chemical (e.g., water, coolant, etc.), and adjusting the cycle operation, based on the data associated with the sample. In some examples, the operation 1120 may include generating an alarm based on the data associated with the sample. In some examples, the operation 1120 may include setting a timer. In some examples, the operation 1120 may include operating a subset of devices (e.g., a secondary set of devices) to turn on or off the processing devices according to a predetermined threshold as part of a control instruction (or program). In some examples, when a predetermined threshold is met, the operation 1120 can continue to operation 1130 of discharging the sample in the sample channel into the sample supply. In some examples, based on comparison between a predetermined threshold and a reading value of the processing device(s), the operation 1120 can include turning on or off pump boards, valves (e.g., valves to a chemical reservoir, etc.), or other devices to implement a proper action (e.g., chemical reaction) according to the preprogramed thresholds and the reading value. In some examples, based on the comparison, the operation 1120 can include controlling the pump boards (and/or the sample supplies) to fill the sample supplies to a proper level.

The method 11 can continue to the operation 1130 of controlling the first sample supply to discharge the first sample in the sample channel into the first sample supply, in response to a determination that the process for the first sample is finished. In some examples, the operation 1130 may include, based on the evaluation or analysis results, dwelling a certain amount of time to ensure that the sample and/or any material in the sample channel (e.g., added water, chemical, etc.) flow back to the originating system/cycle.

The method 11 can continue to the operation 1140 of repeating the cycling operation for a second sample supply and a second sample supplied by the second sample supply. For example, the operation 1140 may include turning off a first pump board connected to the first sample, or close a valve connected to the first sample. For example, the operation 1140 may include controlling a second pump board connected to a second sample to process. In some examples, in response to an indication that the process for the second sample is finished, the method 11 can continue to the operation 1100 to repeat the process for the first sample (e.g., in a loop fashion). For example, the method 11 may include repeating the operations described herein for multiple samples until a shutdown condition is triggered.

In some examples, the method 11 can be performed based on instructions executable by any systems and/or components. In some examples, a user can define characteristics of the system for which the method 11 is used to generate instructions. For example, the instructions may include controller wide definitions (e.g., system counts, sample counts, device counts, processing device counts, etc.) and system specific definitions (dwell times, threshold levels for the sample of various materials, maximum or minimum dosing volumes and/or time, target levels of composition, dimensional/physical characteristics of the system used for calculations, etc.). In some examples, the method 11 may include loading the instructions for the samples and/or cycle operation, and performing any of the operation 1100—the operation 1140 based on the loaded instructions.

Figure 12:
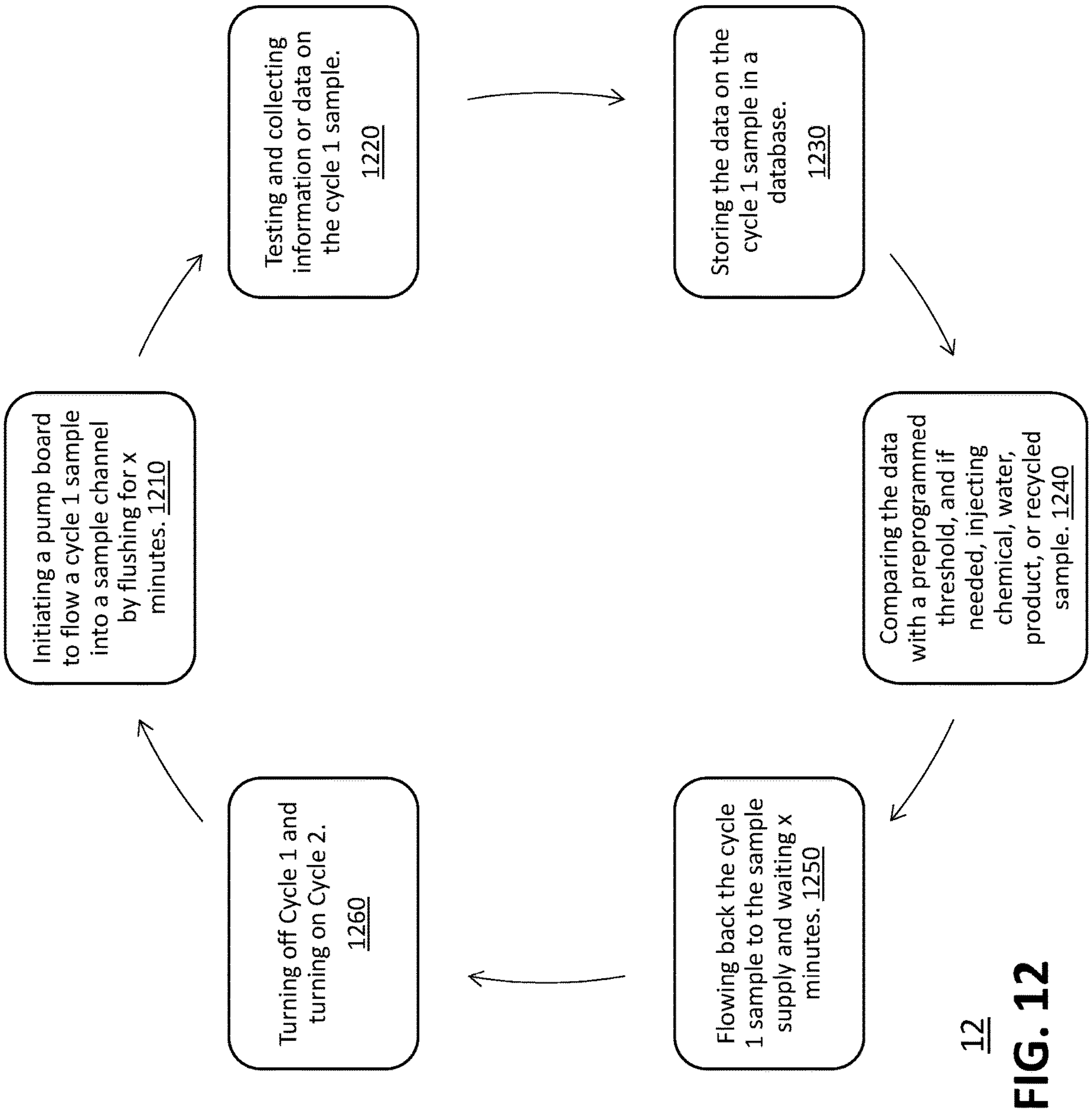
FIG. 12 depicts an example method of the method shown in FIG. 11, according to some examples.

FIG. 12 depicts an example method 12 of the method shown in FIG. 11, according to some examples. The method 12 starts with operation 1210 of initiating a pump board to flow a cycle 1 sample into a sample channel by flushing for a predetermined amount of time (x minutes). The operation 1210 may include opening a valve to flow the cycle 1 sample into the sample channel and waiting a predetermined amount of time to ensure that the cycle 1 sample is ready for further processing in the sample channel.

The method 12 can continue to operation 1220 of testing and collecting information or data on the cycle 1 sample. The operation 1220 may include controlling a processing device to test/collect information or data on the cycle 1 sample. The method 12 can continue to operation 1230 of storing the data on the cycle 1 sample in a database. The method 12 may include sorting/communicating/analyzing the data such that a user and/or a controller can use the data for further processing.

The method 12 can continue to operation 1240 of comparing the data with a preprogrammed threshold. The operation 1240 may include retrieving the stored data associated with the sample and a threshold associated with the stored data (and/or the sample) and determine if the stored data satisfy the threshold based on a comparison. In some examples, based on the comparison, the operation 1240 may include taking an action associated with the sample. The operation 1240 may include injecting chemical, water, product, or a recycled sample to the sample. In some examples, the operation 1240 may include controlling a processing device (e.g., the first device 115, the second device 120, etc.). The operation 1240 may include updating the data associated with the sample based on the action that has been performed. The operation 1240 may include informing a user and/or a controller of the updated data.

The method 12 can continue to operation 1250 of flowing back the cycle 1 sample into the sample supply. The operation 1250 may include opening a valve to flow the cycle 1 sample into the sample supply and waiting a predetermined amount of time (y minutes) to ensure that the sample channel is free of the cycle 1 sample and/or that the sample channel is ready for a cycle 2 sample.

The method 12 can continue to operation 1260 of turning off Cycle 1 and turning on Cycle 2. The operation 1260 may include updating/storing any data associated with the cycle 1 sample and determining a sample to process for Cycle 2. The operation 1260 may include determining whether the system (e.g., the sample channel) is ready for Cycle 2. In response to a determination that the system is ready, the method 12 can continue to operation 1210, but for a cycle 2 sample.

The construction and arrangement of the systems and methods as shown in the various example embodiments are illustrative only. Although only a few embodiments have been described in detail in this disclosure, many modifications are possible. For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may be different from what is depicted. Also, two or more steps may be performed concurrently or with partial concurrence. Such variation will depend on the software and hardware systems chosen and on designer choice and processes of the application. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for processing samples comprising:
- a plurality of sample supplies configured to supply a plurality of samples;
- a sample channel connected to the plurality of sample supplies;
- a first device connected to the sample channel, the first device configured to collect first information about the plurality of samples; and
- a controller configured to perform a cycling operation comprising:
  - (i) controlling a first sample supply of the plurality of sample supplies to supply a first sample in the first sample supply to the sample channel;
  - (ii) controlling the first device to collect the first information about the first sample in the sample channel;
  - (iii) storing data associated with the first sample, the data including the first information about the first sample; and (iv) controlling the first sample supply to discharge the first sample in the sample channel into the first sample supply;

wherein the controller is configured to repeat the cycling operation for a second sample supply and a second sample supplied by the second sample supply.

2. The system of claim 1, wherein the controller is configured to repeat the cycling operation for a predetermined number of sample supplies and a predetermined number of samples supplied by the predetermined number of sample supplies.

3. The system of claim 1, wherein the controller is configured to repeat the cycling operation for a predetermined number of times for the first sample supply and the first sample supplied by the first sample supply, prior to repeating the cycling operation for the second sample supply and the second sample supplied by the second sample supply.

4. The system of claim 1, wherein the controller is configured to:

repeat the cycling operation for the plurality of sample supplies and the plurality of samples supplied by the plurality of sample supplies, until a shutdown condition is triggered.

5. The system of claim 1, wherein the cycling operation comprises waiting for a predetermined delay time prior to controlling the first device to collect the first information about the first sample in the sample channel.

6. The system of claim 1, wherein the cycling operation comprises waiting for a predetermined delay time prior to repeating the cycling operation for the second sample supply and the second sample supplied by the second sample supply.

7. The system of claim 1, further comprising a reservoir configured to supply chemical to the sample channel, wherein the controller is configured to control the reservoir to supply the chemical to the sample channel.

8. The system of claim 7, wherein prior to repeating the cycling operation for the second sample supply and the second sample supplied by the second sample supply, the controller is configured to, based at least in part on the data associated with the first sample, at least one of:

repeat the cycling operation for the first sample supply and the first sample supplied by the first sample supply; or control the reservoir to supply the chemical to the sample channel.

9. The system of claim 7, wherein the cycling operation includes, prior to controlling the first sample supply to discharge the first sample in the sample channel into the first sample supply:

analyzing the data associated with the first sample; and based on the analysis, controlling the reservoir to supply the chemical to the sample channel.

10. The system of claim 1, wherein the controller is configured to send at least a portion of the data associated with the first sample to a user or a database via a network.

11. The system of claim 1, wherein the controller is configured to generate an alarm responsive to the data indicating that a value associated with the first sample is higher or lower than a threshold value.

12. The system of claim 1, further comprising:

a second device connected to the sample channel, the second device configured to collect second information about the plurality of samples;

wherein the cycling operation comprises selectively activating at least one of the first device and the second device based at least in part on a parameter associated with the first sample.

13. A controller for processing samples, the controller configured to perform a cycling operation, the cycling operation comprising:

(i) controlling a first sample supply of a plurality of sample supplies to supply a first sample to a sample channel;

(ii) controlling a first device to collect first information about the first sample in the sample channel;

(iii) storing data associated with the first sample, the data including the first information about the first sample; and (iv) controlling the first sample supply to discharge the first sample in the sample channel into the first sample supply;

wherein the controller is configured to repeat the cycling operation for a second sample supply and a second sample supplied by the second sample supply.

14. The controller of claim 13, wherein the controller is configured to repeat the cycling operation for a predetermined number of sample supplies and a predetermined number of samples supplied by the predetermined number of sample supplies.

15. The controller of claim 13, wherein the controller is configured to repeat the cycling operation for a predetermined number of times for the first sample supply and the first sample supplied by the first sample supply, prior to repeating the cycling operation for the second sample supply and the second sample supplied by the second sample supply.

16. The controller of claim 13, wherein the controller is configured to repeat the cycling operation for the plurality of sample supplies and the plurality of samples supplied by the plurality of sample supplies, until a shutdown condition is triggered.

17. The controller of claim 13, wherein the cycling operation includes, prior to controlling the first sample supply to discharge the first sample in the sample channel into the first sample supply:

analyzing the data associated with the first sample; and based on the analysis, controlling the reservoir to supply the chemical to the sample channel.

* * * * *